United States Patent
Yasuda et al.

(10) Patent No.: US 11,290,650 B2
(45) Date of Patent: Mar. 29, 2022

(54) IMAGE BLUR INFORMATION ACQUISITION APPARATUS AND METHOD, AND STORAGE MEDIUM

(71) Applicant: CANON KABUSHIKI KAISHA, Tokyo (JP)

(72) Inventors: Ryuichiro Yasuda, Tokyo (JP); Junichi Saito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/919,235

(22) Filed: Jul. 2, 2020

(65) Prior Publication Data

US 2021/0006721 A1 Jan. 7, 2021

(30) Foreign Application Priority Data

Jul. 4, 2019 (JP) .............................. JP2019-125466
Jul. 4, 2019 (JP) .............................. JP2019-125467

(51) Int. Cl.
*H04N 5/232* (2006.01)
*H04N 5/14* (2006.01)

(52) U.S. Cl.
CPC ..... *H04N 5/23287* (2013.01); *H04N 5/23254* (2013.01); *H04N 5/23258* (2013.01); *H04N 5/23261* (2013.01)

(58) Field of Classification Search
CPC ........... H04N 5/23287; H04N 5/23261; H04N 5/23258; H04N 5/23254; H04N 5/232; H04N 5/144
See application file for complete search history.

(56) References Cited

U.S. PATENT DOCUMENTS

| | | | |
|---|---|---|---|
| 2016/0316146 A1* | 10/2016 | Kajimura | H04N 5/23254 |
| 2017/0013198 A1* | 1/2017 | Wada | G06T 5/20 |
| 2017/0126978 A1* | 5/2017 | Yun | H04N 5/2254 |
| 2017/0134658 A1* | 5/2017 | Miyahara | H04N 5/23254 |
| 2017/0347032 A1* | 11/2017 | Kajimura | H04N 5/23245 |
| 2019/0174062 A1* | 6/2019 | Miyahara | H04N 5/23248 |

FOREIGN PATENT DOCUMENTS

| | | |
|---|---|---|
| JP | 2005-043780 A | 2/2005 |
| JP | 2016-145856 A | 8/2016 |
| JP | 2017-092616 A | 5/2017 |
| WO | WO-2018030166 A1 * | 2/2018 ......... H04N 5/23258 |

\* cited by examiner

*Primary Examiner* — Albert H Cutler
(74) *Attorney, Agent, or Firm* — Cowan, Liebowitz & Latman, P.C.

(57) ABSTRACT

An image blur information acquisition apparatus includes a first acquisition unit configured to acquire a first shake detection result from a first shake detection unit configured to detect a shake amount of an image capturing apparatus based on a motion vector, a second acquisition unit configured to acquire a second shake detection result from a second shake detection sensor configured to detect a rotational angular velocity, and an estimation unit configured to estimate an amount of offset included in the second shake detection result, based on the first shake detection result and the second shake detection result, wherein the estimation unit is configured to set degree of change of estimation value by updating the offset amount based on a difference between the second shake detection result and the first shake detection result.

21 Claims, 17 Drawing Sheets

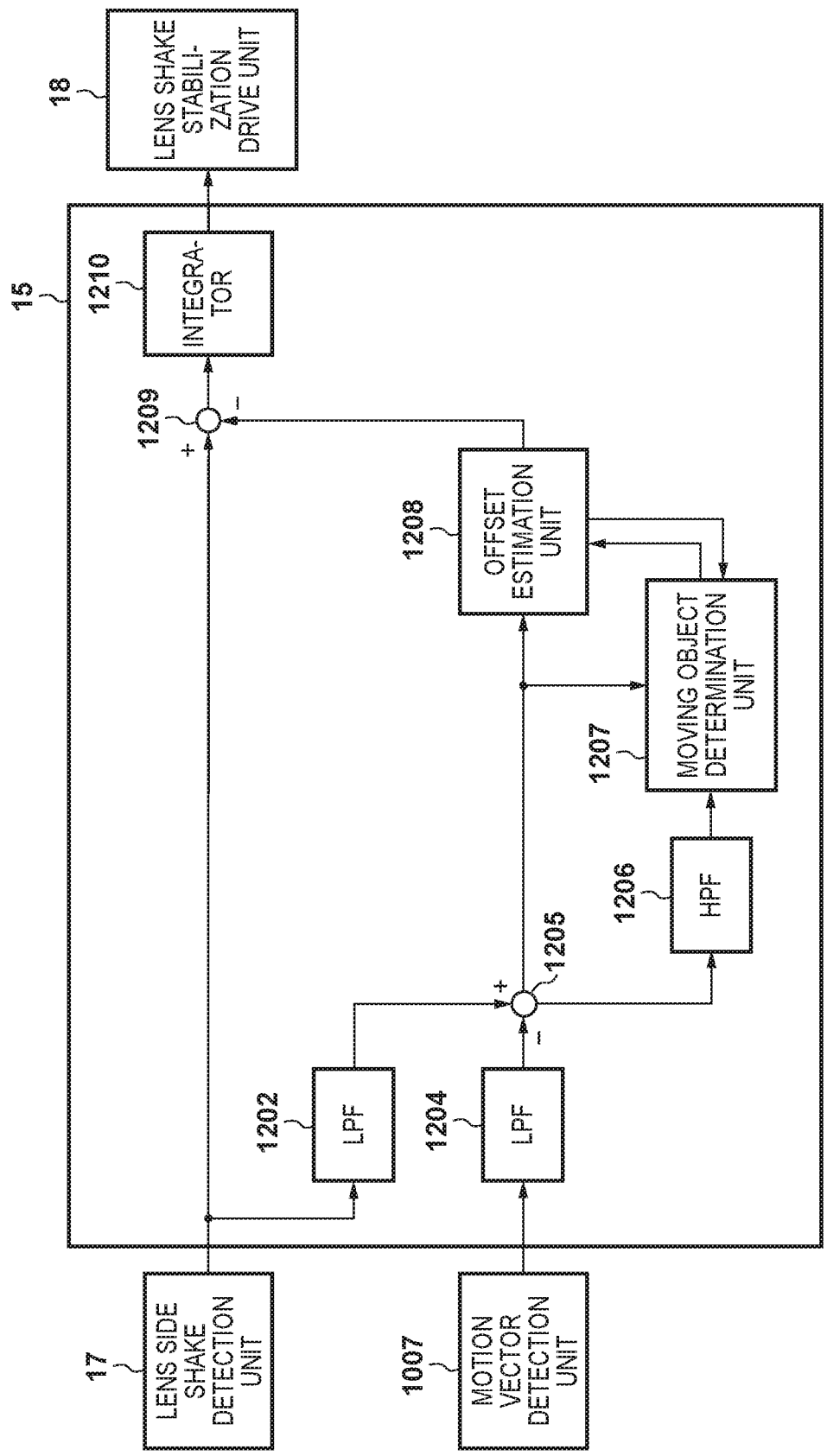

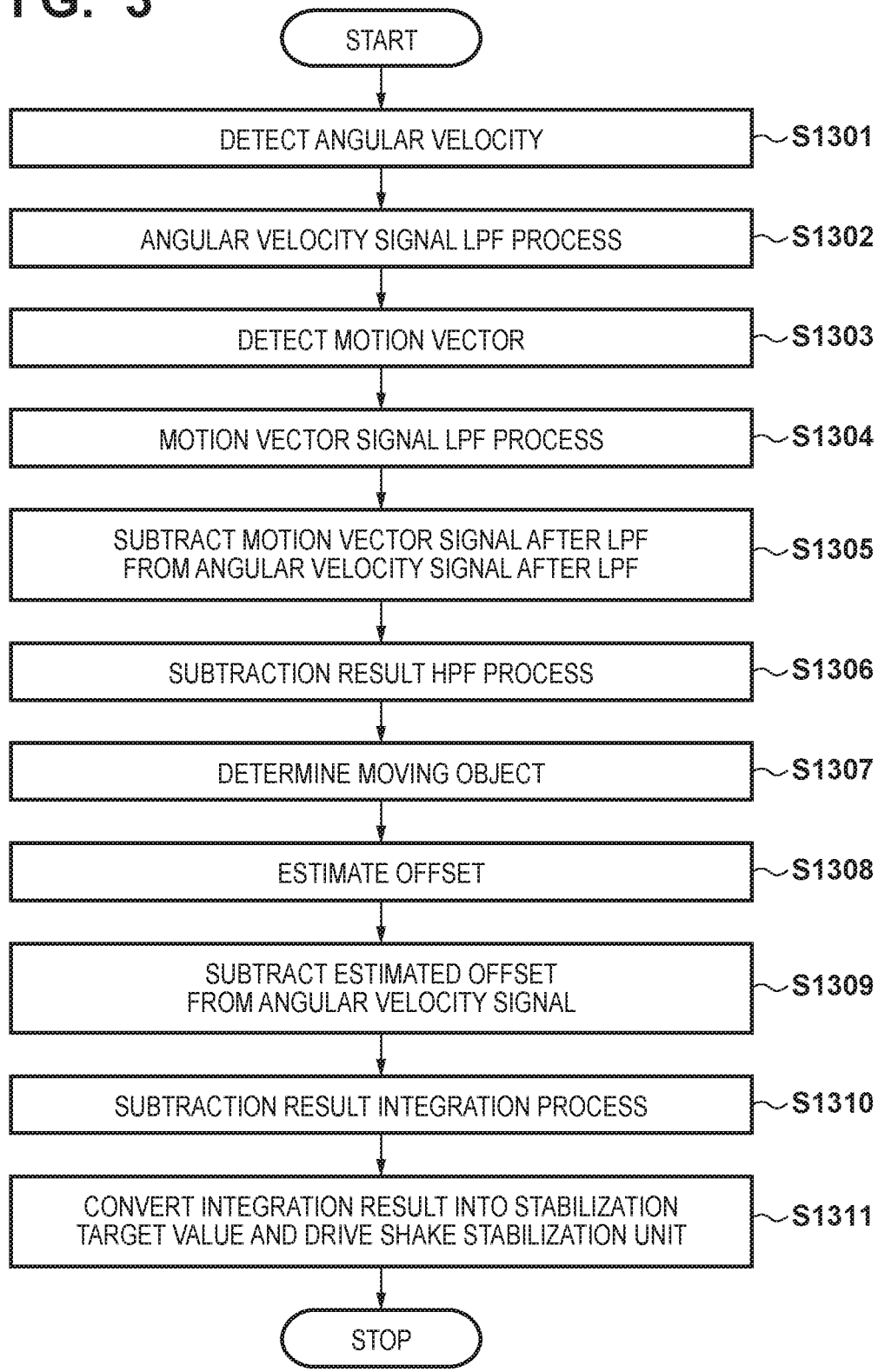

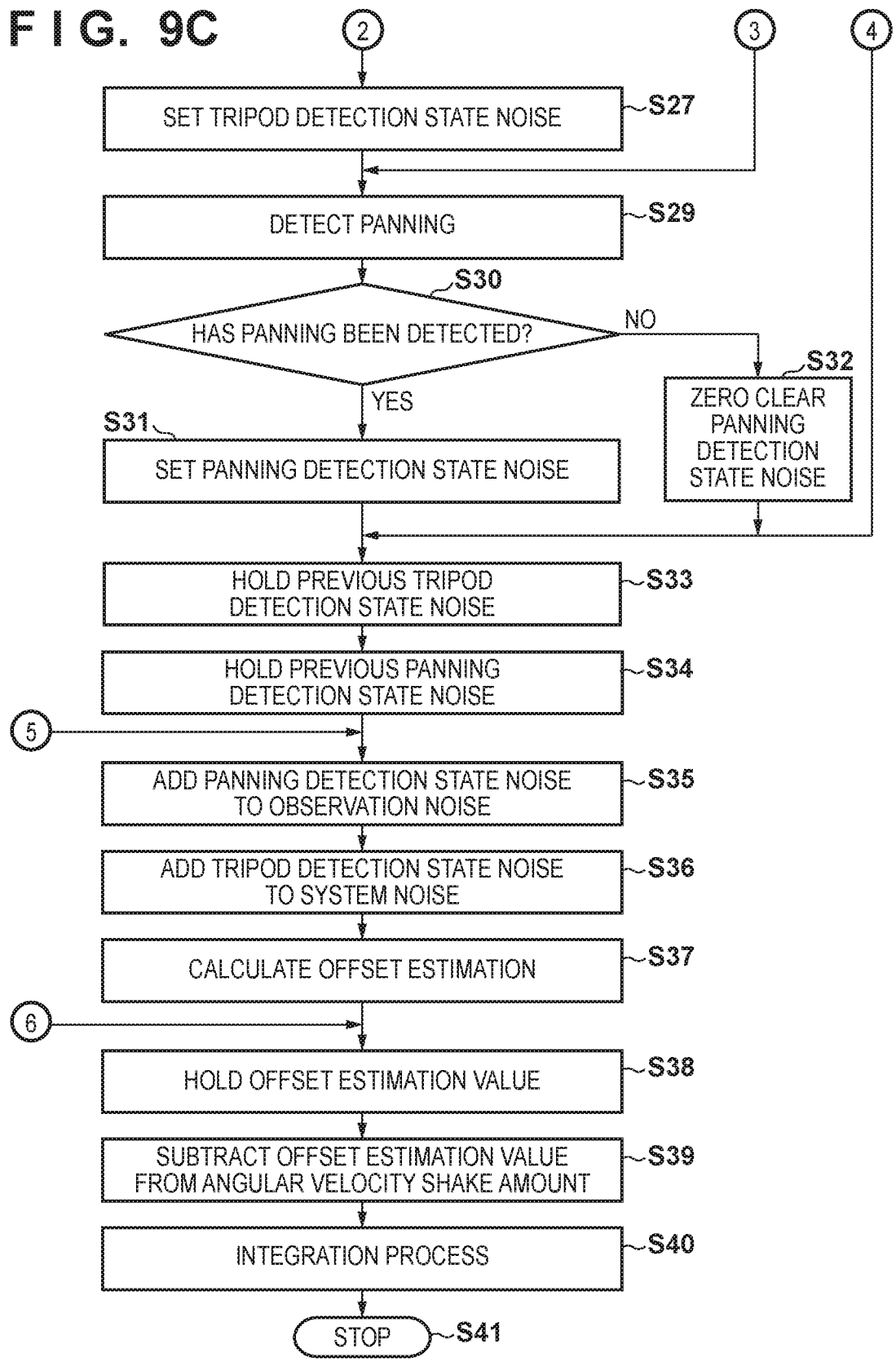

FIG. 12A
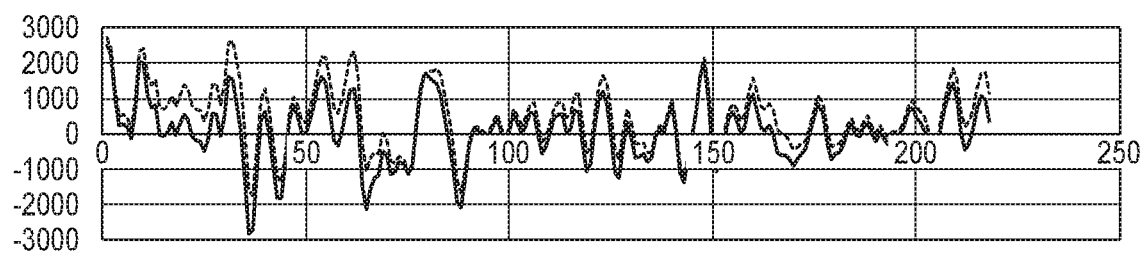
----- SHAKE ANGULAR VELOCITY
——— ANGULAR VELOCITY AFTER REMOVAL OF OFFSET
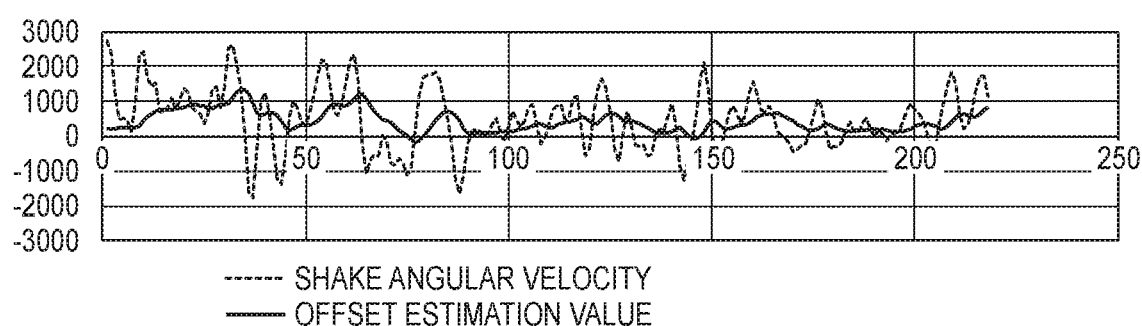
----- SHAKE ANGULAR VELOCITY
——— OFFSET ESTIMATION VALUE
FIG. 12B
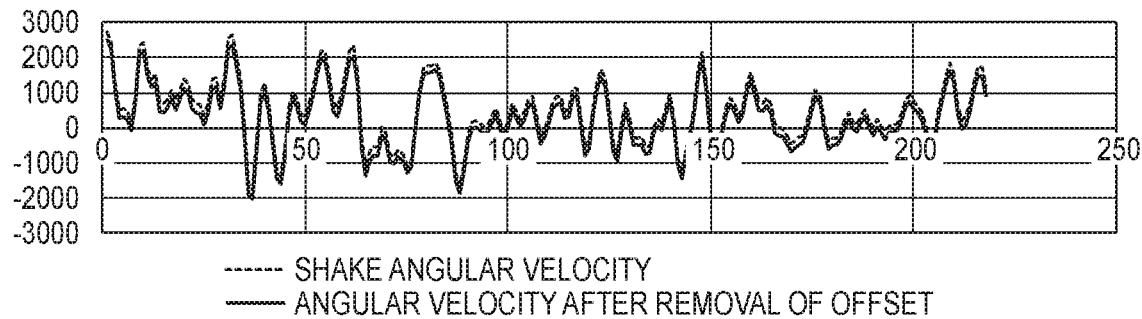
----- SHAKE ANGULAR VELOCITY
——— ANGULAR VELOCITY AFTER REMOVAL OF OFFSET
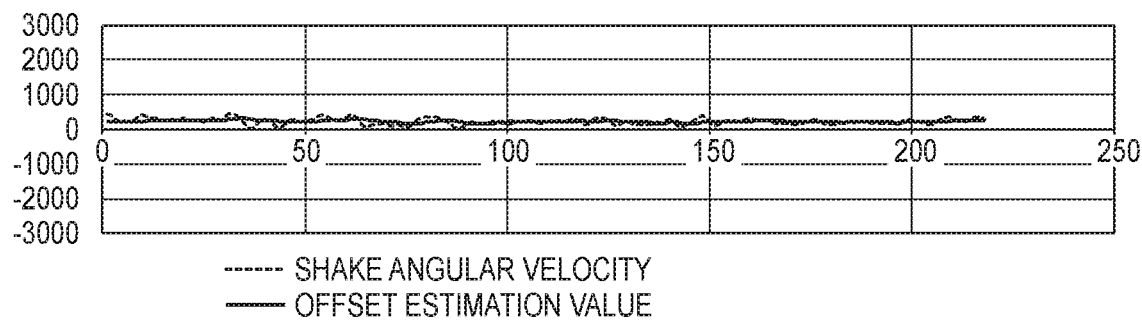
----- SHAKE ANGULAR VELOCITY
——— OFFSET ESTIMATION VALUE

IMAGE BLUR INFORMATION ACQUISITION APPARATUS AND METHOD, AND STORAGE MEDIUM

BACKGROUND OF THE INVENTION

Field of the Invention

The present invention relates to a technique for stabilizing, in an image capturing apparatus, image blur caused by shake of the apparatus.

Description of the Related Art

For an image capturing apparatus such as a digital camera, there have been proposed a number of techniques for stabilizing image blur caused by a shake applied to the apparatus by moving an image sensor such as a CMOS sensor, or some of optical elements of an imaging optical system in a direction orthogonal to the optical axis. An image capturing apparatus having such an image stabilization function generally detects a shake applied to the apparatus by a gyroscope sensor.

The gyroscope sensor, which is a sensor that can detect, as angular velocity, a rotational blur among the shakes applied to the apparatus, exhibits a significantly improved performance in recent years. However, with a significantly increasing demand for image stabilization performance, it is also very important to improve detection precision of the gyroscope sensor. One important challenge in improving the detection precision of the gyroscope sensor is how to remove an offset component included in the gyroscope sensor.

Using a gyroscope sensor signal without removing the offset component will result in so-called drift, which is a symptom of integration error gradually accumulating when integrating the output signal of the gyroscope sensor to be treated as an angle, thereby preventing accurate image stabilization.

Japanese Patent Laid-Open No. 2017-92616 discloses a technique that estimates an offset using an output of an angular velocity sensor, a motion vector corresponding to a difference between frames of an image, and a velocity of a stabilization member, and removes the offset component based on the estimation result.

In addition, Japanese Patent Laid-Open No. 2016-145856 determines whether or not the estimated offset exceeds a predetermined range and, when the estimated offset exceeds the predetermined range, prevents the error from increasing by setting a limit on the offset estimation result.

However, the technique for estimating an offset using a motion vector of Japanese Patent Laid-Open No. 2017-92616 has a problem that motion components of the image capturing apparatus and motion components of the object may get mixed in the motion vector when capturing a moving object, thereby preventing correct estimation of the offset.

Although the technique disclosed in Japanese Patent Laid-Open No. 2016-145856 allows for addressing the aforementioned problem by setting a limit on the estimation result of the offset, it cannot handle a case where the offset has actually gone out of the predetermined range due to variation of temperature or the like. Setting a wider predetermined range taking into account variation of the offset caused by variation of temperature or the like fails to set a limit on offset estimation when capturing a moving object, and cannot solve the problem of increasing estimation error.

SUMMARY OF THE INVENTION

The present invention, which has been made in view of the aforementioned problem, suppresses erroneous estimation of offset of an angular velocity sensor when capturing a moving object.

According to a first aspect of the present invention, there is provided an image blur information acquisition apparatus comprising at least one processor or circuit configured to function as: a first acquisition unit configured to acquire a first shake detection result from a first shake detection unit configured to detect a shake amount of an image capturing apparatus based on a motion vector acquired from a plurality of image signals output from an image sensor configured to photoelectrically convert an object image; a second acquisition unit configured to acquire a second shake detection result from a second shake detection sensor configured to detect a rotational angular velocity of the image capturing apparatus; and an estimation unit configured to estimate an amount of offset included in the second shake detection result, based on the first shake detection result and the second shake detection result, wherein the estimation unit is configured to set degree of change of estimation value by updating the offset amount based on a difference between the second shake detection result and the first shake detection result.

According to a second aspect of the present invention, there is provided an image blur information acquisition method comprising: performing a first acquisition to acquire a shake amount of an image capturing apparatus based on a motion vector acquired from a plurality of image signals output from an image sensor configured to photoelectrically convert an object image; performing a second acquisition to acquire a detection result of a rotational angular velocity from a shake detection sensor configured to detect a rotational angular velocity of the image capturing apparatus; and estimating an amount of offset included in the detection result of the second acquisition, based on the detection result of the rotational angular velocity acquired in the second acquisition and the shake amount acquired in the first acquisition, wherein in estimating the amount of offset, degree of change of estimation value by updating the offset amount is set based on a difference between the detection result of the rotational angular velocity acquired in the second acquisition and the shake amount acquired in the first acquisition.

Further features of the present invention will become apparent from the following description of exemplary embodiments with reference to the attached drawings.

BRIEF DESCRIPTION OF THE DRAWINGS

FIG. 2 is a block diagram illustrating a configuration of a lens system control unit according to the first embodiment.

FIG. 3 is a flowchart illustrating a flow of image stabilization control of a lens system control unit according to the first embodiment.

FIGS. 9A to 9C are flowcharts illustrating a flow of image stabilization control of the lens system control unit.

FIGS. 12A and 12B are time-series variation charts of a shake angular velocity signal, an offset estimation value, and the shake angular velocity signal after the offset estimation value being subtracted therefrom.

DESCRIPTION OF THE EMBODIMENTS

Figure 1A:
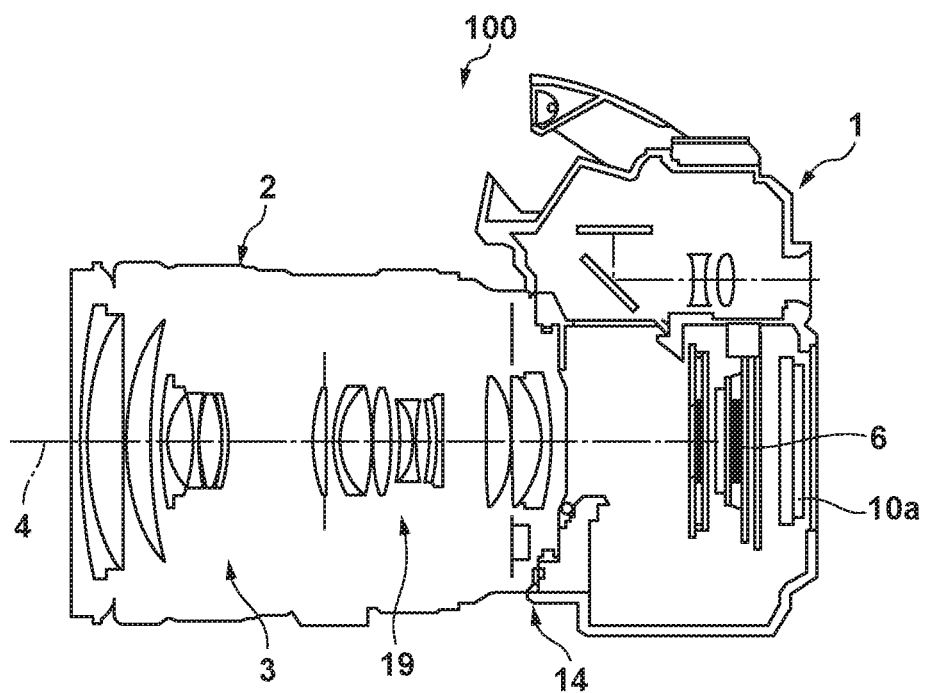
FIGS. 1A and 1B illustrate a configuration of a lens-interchangeable single lens reflex camera system, which is a first embodiment of an image blur information acquisition apparatus of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1B:
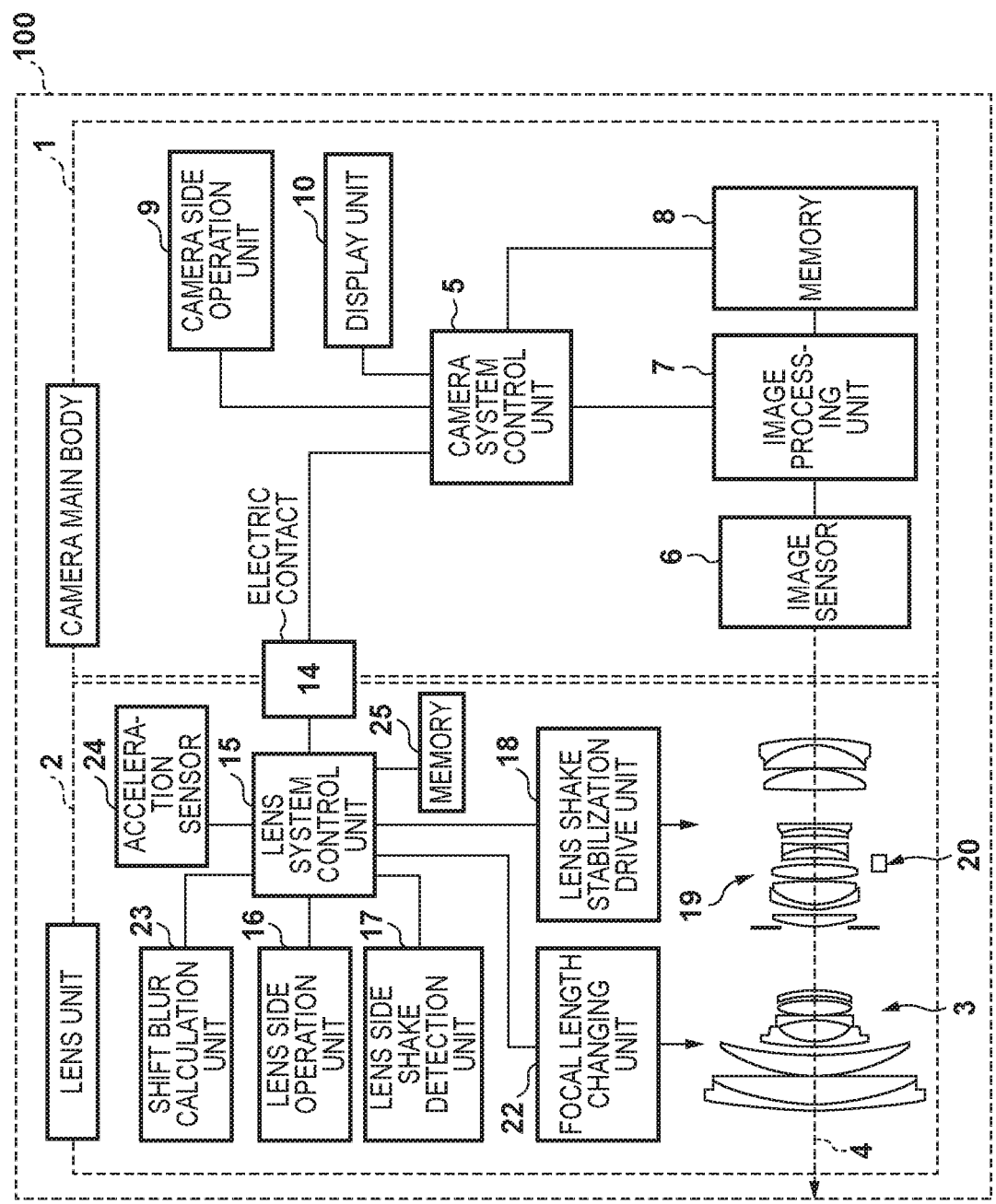

FIGS. 1A and 1B illustrate a configuration of a lens-interchangeable single lens reflex camera system (image capturing system) 100, which is a first embodiment of an image blur information acquisition apparatus of the present invention. FIG. 1A is a mid-section cross sectional view of a camera system according to a first embodiment, and FIG. 1B is a block diagram illustrating an electric configuration of the camera system 100.

In FIG. 1A, the camera system 100 includes a camera main body 1 and a lens unit (image capturing lens) 2 removably attached to the camera main body 1. The lens unit 2 includes an imaging optical system 3 including a plurality of lenses having an optical axis 4 as their axis, with a shake stabilization unit 19 being provided on a part of the imaging optical system 3 to optically stabilize the shake of the image. The shake stabilization unit 19, which is a unit that can shift the optical axis (that can change the relative positions of the object light and the image sensor), may be formed of a shift lens, for example. The camera main body 1 includes an image sensor 6 and a backside display unit 10a. There is provided, between the camera main body 1 and the lens unit 2, an electric contact 14 electrically connecting the camera main body 1 and the lens unit 2.

In FIG. 1B, the lens unit 2 includes, as an electric configuration, a lens system control unit 15, a lens side operation unit 16, a lens side shake detection unit 17, a lens side shake stabilization drive unit 18, a focal length changing unit 22, a shift blur calculation unit 23, an acceleration sensor 24, and a memory 25. The lens system control unit 15 controls the entire lens unit 2 by executing a program stored in the memory 25. The lens side operation unit 16 accepts user operation. The lens side shake detection unit 17, which can detect a rotational shake applied to the camera system 100 with respect to the optical axis 4, uses, for example, a vibrating gyroscope, or the like, using Coriolis force. The lens side shake stabilization drive unit 18 shifts or tilts the shake stabilization unit 19 on a plane perpendicular to the optical axis 4 to stabilize image blur. A lens position detection unit (position acquisition section) 20 detects the position of the shake stabilization unit 19. The focal length changing unit 22 changes the focal length of the imaging optical system 3. The acceleration sensor 24 detects an acceleration applied to the camera system 100. In addition, the shift blur calculation unit 23 can calculate, from the relation between the acceleration detected by the acceleration sensor (acceleration detection unit) 24 and the rotational shake (detection result) detected by the lens side shake detection unit 17, a parallel shake (shift blur, shift shake) applied to the camera system 100.

In addition, the camera main body 1 includes a display unit 10 including a camera system control unit 5, the image sensor 6, an image processing unit 7, a memory 8, a camera side operation unit 9, and the backside display unit 10a. The camera system control unit 5 controls the entire camera system 100 by executing a program stored in a non-volatile memory unit of the memory 8. The image sensor 6 photoelectrically converts an object image into an image signal and outputs the signal. The image processing unit 7 performs image processing required for the image signal output from the image sensor 6. The volatile memory unit of the memory 8 temporarily stores image data. The camera side operation unit 9 accepts user operation. The display unit 10 displays a captured image, information indicating the state of the camera, or the like.

In terms of functional aspects, on the other hand, the camera system 100 including the camera main body 1 and the lens unit 2 includes an image capturing section, an image processing section, a recording and reproducing section, and a control section.

The image capturing section includes the imaging optical system 3 and the image sensor 6, and the image processing section includes the image processing unit 7. In addition, the recording and reproducing section includes the memory 8 and the display unit 10. Here, the display unit 10 includes the backside display unit 10a, a small display panel (not illustrated) configured to display imaging information provided on the top surface of the camera main body 1, and an electronic viewfinder (not illustrated) also referred to as an EVF. The control section includes the camera system control unit 5, the camera side operation unit 9, the lens system control unit 15, the lens side operation unit 16, the lens side shake detection unit 17, the lens side shake stabilization drive unit 18, the lens position detection unit 20, and the focal length changing unit 22. Note that, the lens system control unit 15 also drives a focus lens, a diaphragm, a zoom, or the like (these are not illustrated), besides the shake stabilization unit 19.

Describing each of the aforementioned sections in further detail, the image capturing section is an optical processing system for focusing light coming from an object onto an imaging plane of the image sensor 6 through the imaging optical system 3. Since information of focus evaluation amount/appropriate exposure amount may be acquired from the image sensor 6, the imaging optical system 3 is adjusted based on the information. Accordingly, object light having an appropriate light amount can be exposed in a state being focused on the image sensor 6.

The image processing unit 7, including an A/D converter, a white balance adjusting circuit, a gamma correction circuit, an interpolation calculation circuit or the like, generates an image to be recorded. The color interpolation processing unit, which is provided in the image processing unit 7, performs a color interpolation (demosaicing) process from signals arranged in a Bayer pattern to generate a color image. In addition, the image processing unit 7 uses a predetermined method to compresses still images, moving images, sounds, or the like. Furthermore, the image processing unit 7 includes a motion vector detection unit 1007 (see FIG. 2) that generates a shake detection signal (motion vector) based on comparison between a plurality of images acquired from the image capturing device 6, and calculates a shake amount applied to the camera system 100 based on generated shake detection signal (motion vector).

The memory 8 includes an actual storage unit. The camera system control unit 5 outputs image data to the storage unit of the memory 8, and also displays an image to be presented to the user on the display unit 10.

The camera system control unit 5 generates and outputs a timing signal, or the like, when capturing an image. The camera system control unit 5 controls the image capturing system, the image processing system, and the recording and reproducing system, respectively, according to external operations. For example, the camera system control unit 5 detects depression of a shutter release button (not illustrated), and then controls driving of the image sensor 6, operation of the image processing unit 7, compression processing, or the like. The camera system control unit 5 further controls the state of each segment of the display unit 10 displaying information. In addition, the backside display unit 10*a*, including a touch panel, may also serve as the display unit 10 and the camera side operation unit 9.

Next, there will be described an adjustment operation of the imaging optical system. The camera system control unit 5, having the image processing unit 7 connected thereto, obtains an appropriate focus position and diaphragm position based on signals from the image sensor 6 and the photographer's operation on the camera side operation unit 9. The camera system control unit 5 issues an instruction to the lens system control unit 15 via the electric contact 14, whereby the lens system control unit 15 controls the focal length changing unit 22 and a diaphragm drive unit (not illustrated). Furthermore, in the mode of performing image stabilization, the camera system control unit 5 controls the lens side shake stabilization drive unit 18 based on the signal acquired from the lens side shake detection unit 17 and the detection information from the lens position detection unit 20. The shake stabilization unit 19 includes a drive mechanism including a magnet and a flat plate coil, for example. In addition, the lens position detection unit 20, including a magnet and a Hall element, for example, detects the amount of movement (stabilization amount) of the shake stabilization unit 19.

In a specific control method for image stabilization, the lens system control unit 15 first receives a shake signal detected by the lens side shake detection unit 17. Based on the detection result, the lens system control unit 15 calculates a drive amount of the shake stabilization unit 19 to stabilize the image blur. Subsequently, the lens system control unit 15 outputs the calculated drive amount to the lens side shake stabilization drive unit 18 as a command value, and performs feedback control so that the position detected by the lens position detection unit 20 follows the command value. Accordingly, the lens system control unit 15 drives the shake stabilization unit 19.

Note that, as has been described above, controlling the operation of each part of the camera main body 1 in accordance with user operation on the camera side operation unit 9 allows for capturing still images and moving images.

FIG. 2 is a block diagram illustrating a detailed configuration of a part conducting image stabilization control in the lens system control unit 15 according to the present embodiment. Each block illustrated in FIG. 2 is realized by executing, by the lens system control unit 15, programs stored in the memory 25. Since control of image stabilization is the same for both the Pitch direction and the Yaw direction, only one of the axes will be described. In addition, it is assumed in the present embodiment that the shake stabilization unit 19 is fixed while an offset estimation unit 1208 is estimating the offset.

In FIG. 2, the detection signal (rotational angular velocity) of the shake information of the camera system 100, which has been output from the lens side shake detection unit 17, is input to the lens system control unit 15, and then input to a low-pass filter (LPF) 1202 and a subtracter 1209.

The low-pass filter 1202 removes or reduces the high-frequency component from the shake signal detected by the lens side shake detection unit 17. The low-pass filter 1202 outputs the signal subjected to a filtering process to the subtracter 1205.

The motion vector detection unit 1007 detects a motion vector based on comparison between a plurality of images acquired from the image sensor 6. The motion vector detected by the motion vector detection unit 1007 is input to a low-pass filter (LPF) 1204.

The low-pass filter 1204 acquires the motion vector information detected by the motion vector detection unit 1007, and removes or reduces the high-frequency component from the acquired motion vector information. The low-pass filter 1204 outputs the signal subjected to the filtering process to the subtracter 1205.

The subtracter 1205 subtracts the output signal of the low-pass filter 1204 from the output signal of the low-pass filter 1202. The output signal of the subtracter 1205 is output to the offset estimation unit 1208, a high-pass filter (HPF) 1206, and a moving object determination unit 1207.

The high-pass filter 1206 removes or reduces the low-frequency component from the output signal of the subtracter 1205. The high-pass filter 1206 outputs the signal subjected to the filtering process to the moving object determination unit 1207.

The moving object determination unit 1207 determines whether or not the object is moving, based on the output signal of the subtracter 1205 and the output signal of the high-pass filter 1206. The moving object determination unit 1207 outputs, to the offset estimation unit 1208, an observation noise signal generated based on the absolute value of the output signal of the high-pass filter 1206. The observation noise signal will be described below.

The offset estimation unit 1208 estimates an offset amount of the output signal of the lens side shake detection unit 17, based on the output signal of the subtracter 1205 and the output signal of the moving object determination unit 1207. The output signal of the offset estimation unit 1208 is output to the moving object determination unit 1207 and the subtracter 1209.

The subtracter 1209 subtracts the offset value estimated by the offset estimation unit 1208 from the output signal of the lens side shake detection unit 17. The output signal of the subtracter 1209 is output to an integrator 1210. The integrator 1210 performs an integration process on the output signal of the subtracter 1209. The output signal of the integrator 1210 is output to the lens shake stabilization drive unit 18.

The lens shake stabilization drive unit 18 converts the output value of the integrator 1210 into a stabilization target value, and drives the shake stabilization unit 19 so as to cancel the image blur caused by camera shake or the like. Correction lenses such as shift lenses forming the imaging optics may be mentioned as an example of the shake stabilization unit 19. In addition, there may be provided, in place of the shake stabilization unit 19, a drive unit that moves the image sensor 6 in a direction which is different from the optical axis. Alternatively, a gimbal mechanism that can be drive-controlled by a command from the camera main body 1, an automatically controllable electric mount, or the like may be used.

<Details of Offset Estimation Unit>

Next, there will be described a method for offset estimation processing of the lens side shake detection unit 17 performed by the offset estimation unit 1208, referring to mathematical formulae. When forming the offset estimation unit 1208 using a known linear Kalman filter, a general formula of the linear Kalman filter may be represented by Formulae (1) to (7) below.

$$x_t = A x_{t-1} + B u_t + E_t \quad \text{Formula (1)}$$

$$z_t = C x_t + \sigma_t \quad \text{Formula (2)}$$

where Formula (1) represents an operation model in a state space representation, and Formula (2) represents an observation model. "A" denotes a system matrix in the operation model, and "B" denotes an input matrix. In addition, "C" denotes an output matrix in the observation model, and "A", "B" and "C" are respectively expressed in a matrix form. In addition, "Et", "$\sigma_t$", and "t" denote process noise, observation noise, and discrete time, respectively.

$$\hat{x}_t^- = A \hat{x}_{t-1} + B u_t \quad \text{Formula (3)}$$

$$\hat{P}_t^- = A \hat{P}_{t-1} A^T + \Sigma_x \quad \text{Formula (4)}$$

Here, Formula (3) represents an a-priori estimation value in a prediction step, and Formula (4) represents a-priori error covariance (error variance). In addition. $\Sigma x$ represents a variance of noise in the operation model.

$$K_t = \frac{\hat{P}_t^- C^T}{\left( C \hat{P}_t^- C^T + \sum_z \right)} \quad \text{Formula (5)}$$

$$\hat{x}_t = \hat{x}_t^- + K_t (z_t - C \hat{x}_t^-) \quad \text{Formula (6)}$$

$$\hat{P}_t = (I - K_t C) \hat{P}_t^- \quad \text{Formula (7)}$$

Here, Formula (5) represents the calculating expression of the Kalman gain in the filtering step, and the subscript T represents a transpose matrix. Furthermore, Formula (6) represents a posterior estimation value according to the Kalman filter, and Formula (7) represents a posterior error covariance. In addition. $\Sigma z$ represents a variance of the noise in the observation model.

In the present embodiment, the offset value is denoted xt, the observed shake amount is denoted zt, the process noise is denoted Et, and the observation noise is denoted at in order to estimate the offset of the lens side shake detection unit 17. Accordingly, a model of offset can be expressed by the following linear model in which there is no input term u in Formula (1), and A=C=1 holds in Formulae (1) and (2).

$$x_t = x_{t-1} + E_t \quad \text{Formula (8)}$$

$$z_t = x_t + \sigma_t \quad \text{Formula (9)}$$

Here, the variance $\Sigma x$ of noise in the operation model in Formula (4) is expressed by the system noise ax, and the variance $\Sigma z$ of noise of the observation model in Formula (5) is expressed by the observation noise at. Furthermore, letting $\hat{x}^-$ be the offset a-priori estimation value, $\hat{P}_t^-$ be the error covariance estimation value at a time point t, $k_t$ be the Kalman gain at the time point t, at be the observation noise, and $z_t$ be the shake amount observed by the lens side shake detection unit 17, the Kalman filter can be implemented by the following formulae.

$$\hat{x}_t^- = \hat{x}_{t-1} \quad \text{Formula (10)}$$

$$\hat{P}_t^- = \hat{P}_{t-1} + \sigma_x \quad \text{Formula (11)}$$

$$k_t = \frac{\hat{P}_t^-}{\left( \hat{P}_t^- + \sigma_t \right)} \quad \text{Formula (12)}$$

$$\hat{x}_t = \hat{x}_t^- + k_t (z_t - \hat{x}_t^-) \quad \text{Formula (13)}$$

$$\hat{P}_t = (I - k_t) \hat{P}_t^- \quad \text{Formula (14)}$$

The offset estimation unit 1208, which is implemented by arithmetic expressions from Formula (10) to Formula (14) described above, calculates an offset a-priori estimation value $\hat{x}^-$ and an error covariance a-priori estimation value $\hat{P}_t^-$ from the offset estimation value $\hat{x}_{t-1}$ and the system noise ax at a time point t−1 of the update cycle of estimation calculation, and the error covariance estimation value $\hat{P}_{t-1}$ at the time point t−1. Subsequently, the Kalman gain $k_t$ is calculated based on the error covariance a-priori estimation value $\hat{P}_t^-$ and the observation noise at output from the moving object determination unit 1207. Subsequently, according to Formula (13), the offset a-priori estimation value $\hat{x}^-$ is modified by a value acquired by multiplying the error between the observed shake amount $z_t$ and the offset a-priori estimation value $\hat{x}^-$ by the Kalman gain $k_t$, whereby the offset estimation value $\hat{x}_t$ is calculated. Additionally, the error covariance a-priori estimation value $\hat{P}_t^-$ is modified according to Formula (14), whereby the error covariance estimation value $\hat{P}_t$ is calculated. The offset estimation value is calculated by repeatedly updating and modifying the a-priori estimations by the aforementioned calculation at each calculation cycle.

With regard to the Kalman filter implemented as described above, there will be described variation of the offset estimation operation of the Kalman filter due to variation of the magnitude of the observation noise at, referring to Formulae (12) and (13).

First, if the observation noise at is small, the variation in the offset estimation value $\hat{x}_t$ increases. According to Formula (12), the Kalman gain $k_t$ turns out to be a value close to 1. In this case, the value of the second term on the right side of the Formula (13) is close to the very value of the error between the observed shake amount $z_t$ and the offset a-priori estimation value $\hat{x}^-$, whereby the degree of modifying the offset a-priori estimation value $\hat{x}^-$ increases. When, on the contrary, the observation noise at is large, the variation in the offset estimation value $\hat{x}_t$ decreases. According to Formula (12), the Kalman gain $k_t$ becomes a value close to 0, and the value of the second term on the right side of Formula (13) also turns out to be a value close to 0. Therefore, the degree of modifying the offset a-priori estimation value $\hat{x}^-$ decreases.

<Description of Flowchart>

Figure 4A:
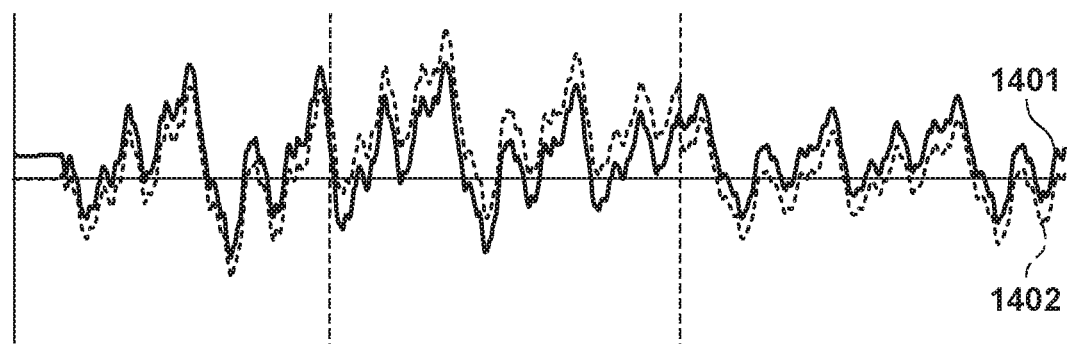
FIGS. 4A to 4C illustrate a temporal change of each output signal in the presence of a moving object.
Figure 4B:
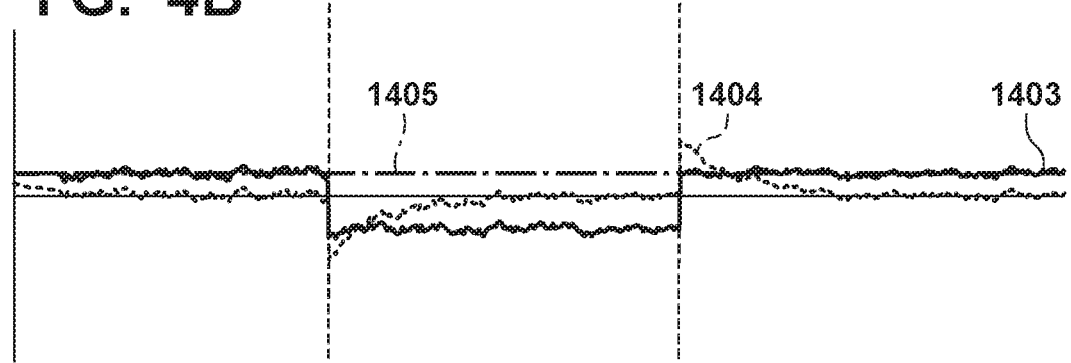
Figure 4C:
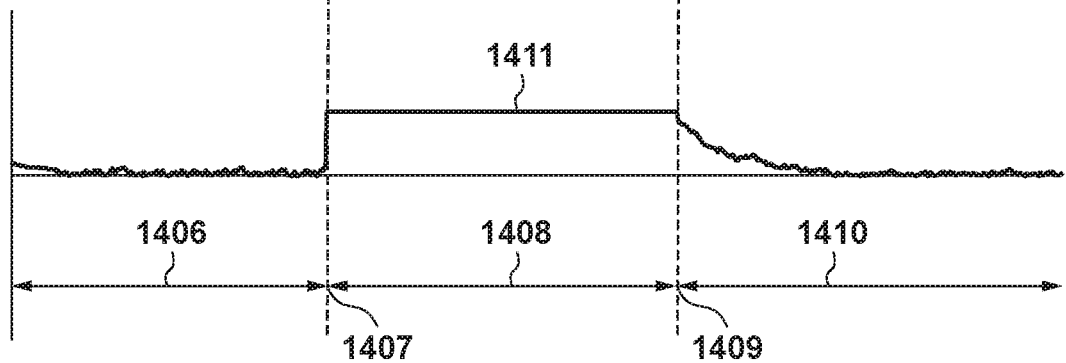

Next, there will be described a calculation process of a shake stabilization target value to be performed by a part that conducts image stabilization control in the lens system control unit 15 configured as described above, referring to the flowchart of FIG. 3 and the graphs of FIGS. 4A to 4C representing temporal change of each output signal. Here, a period 1406 and a period 1410 in FIGS. 4A to 4C indicate periods during which the object is staying still, and a period 1408 in FIGS. 4A to 4C indicate a period during which the object is moving. In addition, a time point 1407 in FIGS. 4A to 4C indicate the start time of the period 1408, and a time point 1409 indicates the end time of the period 1408. In addition, the movement of the object indicates a case of traversing the front of the camera system 100 at a constant velocity.

At S1301, the lens side shake detection unit 17 detects a motion occurring in the camera system 100 and outputs a shake signal. The lens side shake detection unit 17 includes a gyroscope sensor, for example, in which case the shake signal is an angular velocity signal.

At S1302, a low-pass filtering process is performed on the shake signal. The low-pass filter 1202 removes or reduces the high-frequency component from the shake signal detected by the lens side shake detection unit 17. A curve 1401 in FIG. 4A indicates a shake signal subjected to the low-pass filtering process.

At S1303, the motion vector detection unit 1007 detects a motion vector. Calculation of the motion vector is detected by analyzing the shake between frame images of the image signal output from the known image processing unit 7. At S1304, the low-pass filtering process is performed on the detected motion vector. The low-pass filter 1204 removes or reduces the high-frequency component from the motion vector signal detected by the motion vector detection unit 1007. A curve 1402 in FIG. 4A indicates a motion vector signal subjected to the low-pass filtering process.

At S1305, the subtracter 1205 subtracts the motion vector signal subjected to low-pass filtering from the shake signal subjected to low-pass filtering. A curve 1403 in FIG. 4B indicates the output signal of the subtracter 1205. The output signal of the subtracter 1205 includes an offset component of the lens side shake detection unit 17 and a motion component of the moving object.

At S1306, a high-pass filtering process is performed on the subtraction result acquired at S1305. The high-pass filter 1206 removes or reduces the low-frequency component from the signal of the subtraction result acquired by the subtracter 1205. A curve 1404 in FIG. 4B represents the output signal of the high-pass filter 1206. Performing high-pass filtering allows for removing or reducing the offset component from the output signal of the subtracter 1205.

<Determination Method of Moving Object>

At S1307, the moving object determination unit 1207 outputs an observation noise signal based on whether or not the object is moving. There will be described a generation method of observation noise, referring to FIGS. 4A to 4C.

The moving object determination unit 1207 uses, for generation of observation noise, the absolute value of the output signal of the high-pass filter 1206 indicated by the curve 1404 in FIG. 4B. During the period 1406, the absolute value of the output signal of the high-pass filter 1206 is small, whereby the value of the observation noise generated by the moving object determination unit 1207 turns out to be small as well. Accordingly, the degree of modifying the offset value increases due to characteristics of the update rule of the Kalman filter.

<Determination of Start of Movement of Moving Object>

At the time point 1407, the moving object determination unit 1207 determines that the object is moving, based on that the absolute value of the output signal of the high-pass filter 1206 is larger than a predetermined value (determination result). The predetermined value is set to be larger than the maximum value of a measured signal acquired by preliminarily (for example, during parameter adjustment at the production plant of the camera system 100) measuring the output signal of the high-pass filter 1206 with the object being fixed. However, it is intended not to detect the maximum value until the time constant response of the high-pass filter 1206 converges.

The observation noise is generated using the absolute value of the output value of the high-pass filter 1206 at the time point 1407. Since the value of the observation noise is large, characteristics of the update rule of the Kalman filter causes the degree of modifying the offset value to decrease, whereby a value close to the previous offset estimation value turns out to be the offset estimation value. Furthermore, the moving object determination unit 1207 holds the offset estimation value acquired at the time point 1407.

In addition, the offset estimation value at the time point when estimation of the previous offset value ended (e.g., the point time when the camera system 100 is powered off) is separately stored, taking into account a case where there exists a moving object before starting estimation of the offset value (e.g., before powering on the camera system 100). Subsequently, when starting estimation of the offset value at the time point 1407, the separately stored offset estimation value is held.

During the period 1408, the moving object determination unit 1207 keeps outputting the maximum value while updating and holding the maximum value of the observation noise generated in the period 1408.

The reason to keep outputting the maximum value will be described. The output signal of the high-pass filter 1206 converges close to 0 as a result of the high-pass filtering process, whereby the value of the observation noise generated from the absolute value of the output signal of the high-pass filter 1206 gradually decreases. Therefore, the degree of modifying the estimation value gradually increases even though the object is moving, which may result in an erroneous estimation of the offset. In order to prevent such an erroneous estimation, the moving object determination unit 1207 keeps outputting, during the period 1408, the maximum value of the observation noise generated in the period 1408.

<Determination of End of Movement of Moving Object>

At the time point 1409, the moving object determination unit 1207 determines that the moving object has disappeared from the fact that the difference between the offset estimation value held at the time point 1407 and the output value of the subtracter 1205 has fallen below a predetermined value. Here, the moving object determination unit 1207 releases the holding of the maximum value of the observation noise, and generates observation noise using the absolute value of the output value of the high-pass filter 1206. The observation noise signal generated by the aforementioned technique is indicated by a curve 411 in FIG. 4C.

At S1308, the offset estimation unit 1208 estimates the offset while changing the update rule of the Kalman filter according to the observation noise signal output by the moving object determination unit 1207. A curve 1405 in FIG. 4B indicates the estimated offset. During the period 1408 in FIG. 4C, the observation noise signal output from the moving object determination unit 1207 is large, whereby the degree of modifying the estimation value decreases and the estimation value is less likely to change, so that erroneous estimation is suppressed. Here, the degree of modifying the estimation value by updating the estimation value is referred to as the update rate of estimation value, with a low modification degree being referred to as a slow update rate and a high modification degree as a fast update rate.

At S1309, the subtracter 1209 subtracts the offset estimation value output by the offset estimation unit 1208 from the shake signal output from the lens side shake detection unit 17.

At S1310, the integrator 1210 performs an integration process on the offset-removed shake signal, and outputs the integral value to the lens shake stabilization drive unit 18.

At S1311, the lens shake stabilization drive unit 18 converts the output value of the integrator 1210 into a shake stabilization target value, and drives the shake stabilization unit 19 to cancel the image blur caused by camera shake or the like.

As has been described above according to the first embodiment, the object is determined to be moving when the difference between the detection result of the lens side shake detection unit 17 and the detection result of the motion vector detection unit 1007 is equal to or larger than a predetermined value. Subsequently, increasing the observation noise to reduce variation of the estimation value while the object is moving allows for suppressing erroneous estimation of the offset value. As a result, it is possible to guarantee the image stabilization performance even when the object is moving. Here, the difference between the detection result of the lens side shake detection unit 17 and the detection result of the motion vector detection unit 1007 is intended to also include the difference between signals subjected to the filtering process on respective detection results, as described above.

Second Embodiment

<Description of Configuration Blocks>

Figure 5:
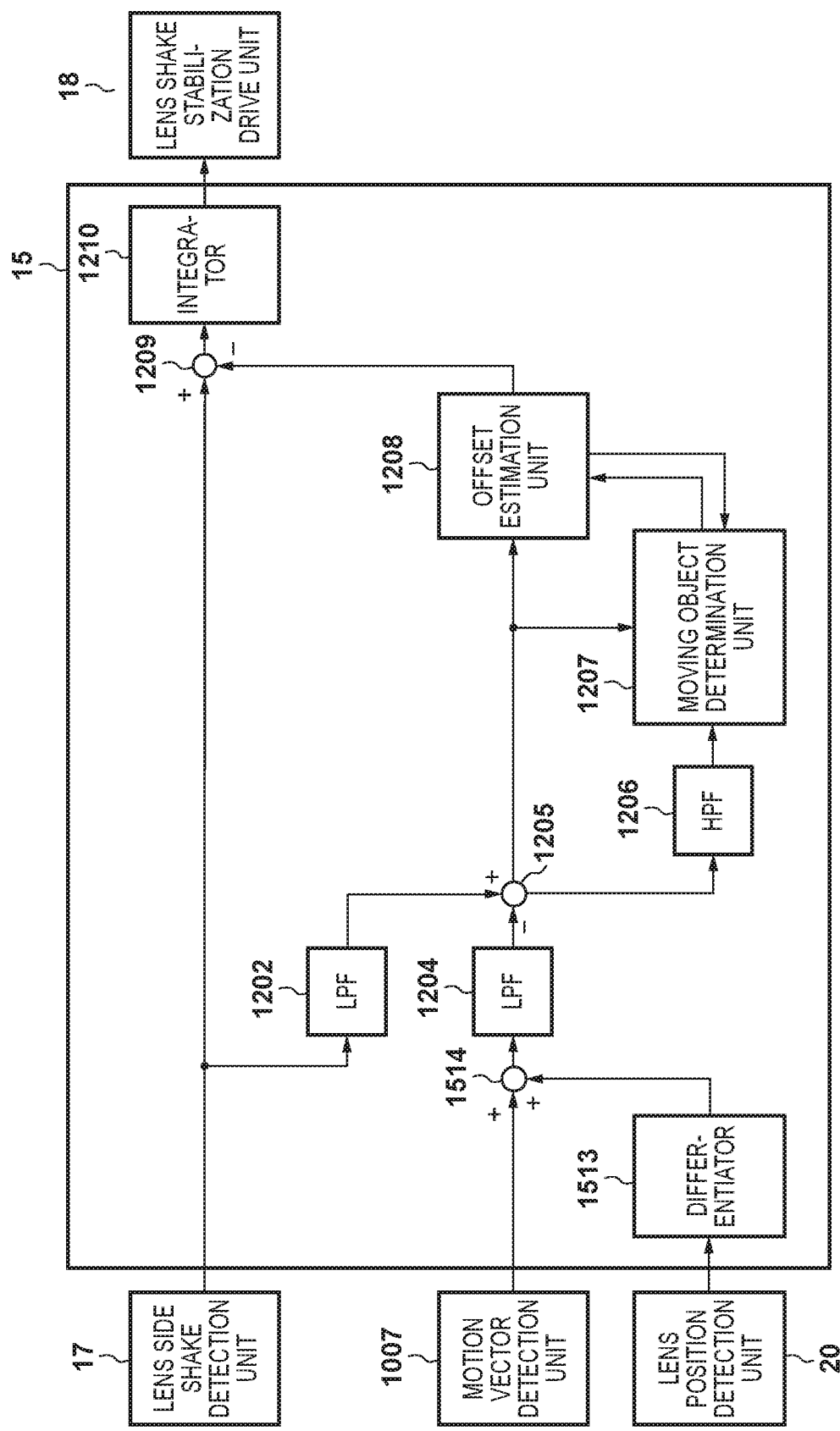
FIG. 5 is a block diagram illustrating a configuration of a lens system control unit according to a second embodiment.

FIG. 5 is a block diagram illustrating a detailed configuration of a part that conducts image stabilization control in the lens system control unit 15 according to a second embodiment of the present invention. Note that, in FIG. 5, components having the same functions as those of the first embodiment are provided with the same reference numerals as those in FIG. 2, with description thereof being omitted. Each block illustrated in FIG. 5 is realized by executing, by the lens system control unit 15, a program stored in the memory 25.

Note that the control of image stabilization is the same for both the Pitch direction and the Yaw direction and therefore only one of the axes will be described. In addition, it is assumed in the second embodiment that the shake stabilization unit 19 is performing image stabilization while an offset estimation unit 1208 is estimating the offset.

In FIG. 5, the lens position detection unit 20 detects the position of the shake stabilization unit 19. The output signal of the lens position detection unit 20 is output to a differentiator 1513. The differentiator 1513 performs a differential process on the output signal of the lens position detection unit 20. The output signal of the differentiator 1513 is output to an adder 1514. The adder 1514 adds the motion vector detected by the motion vector detection unit 1007 and the output signal of the differentiator 1513. The output signal of the adder 1514 is output to the low-pass filter 1204.

<Description of Flowchart>

Figure 6:
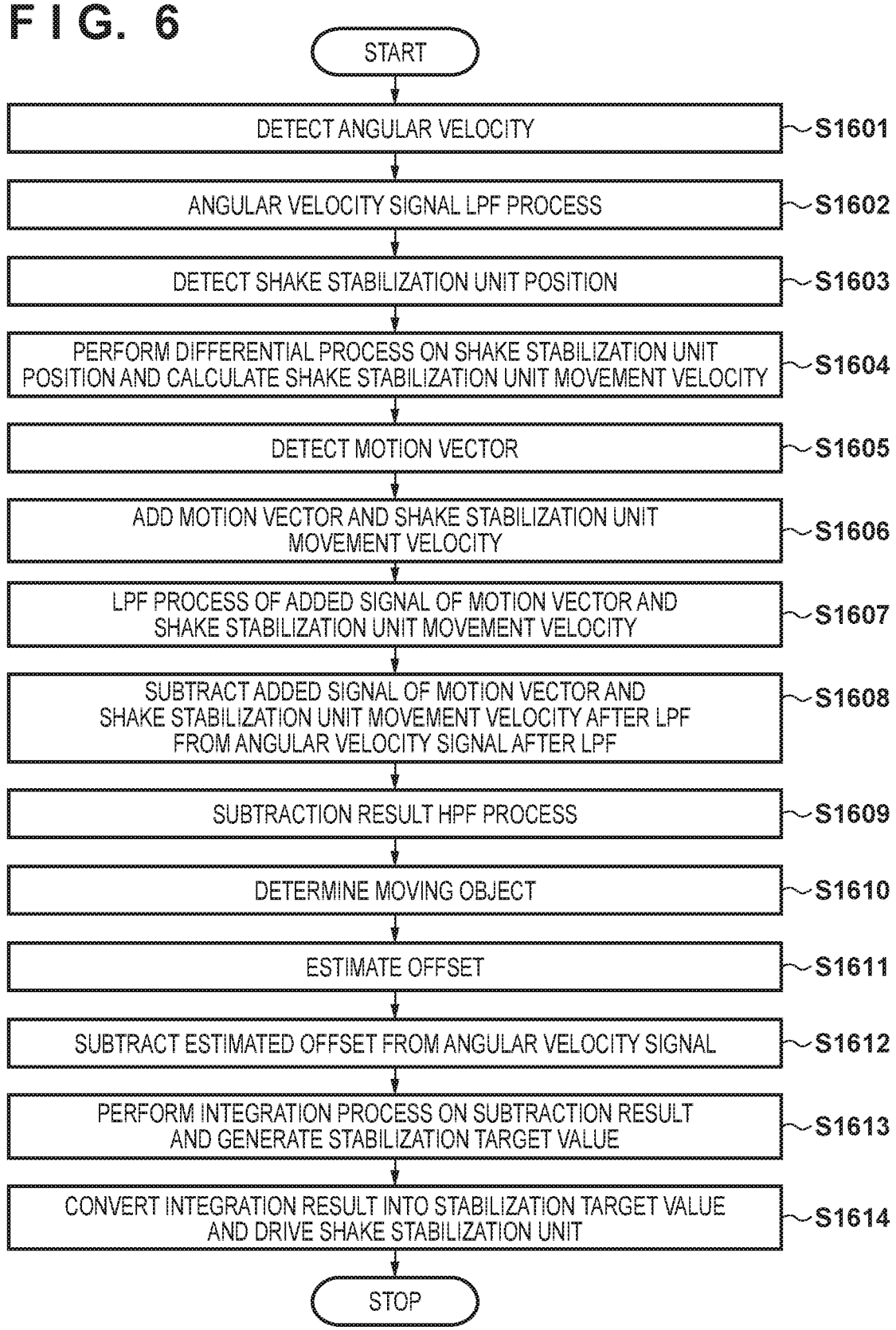
FIG. 6 is a flowchart illustrating a flow of image stabilization control of a lens system control unit according to the second embodiment.

Next, referring to the flowchart of FIG. 6, there will be described a calculation process of a shake stabilization target value of a part that conducts image stabilization control in the lens system control unit 15 configured as described above. Here, the processing illustrated at steps S1601, S1602, S1605 and S1609 to S1614 of FIG. 6 is similar to the processing illustrated at steps S1301 to S1303 and S1306 to S1311 of FIG. 3, and therefore these descriptions will not be repeated, and only the processing at S1603, S1604 and S1606 to S1608 will be described.

At S1603, the lens position detection unit 20 detects the position of the shake stabilization unit 19.

At S1604, the differentiator 1513 performs a differential process on the position signal of the shake stabilization unit 19, which is the output signal from the lens position detection unit 20, and converts the position signal to the movement velocity for the shake stabilization unit 19. Here, the offset estimation process in the present embodiment is performed at a preliminarily set discrete cycle, and therefore the differential operation represents the drive velocity of the shake stabilization unit 19 (hereinafter referred to as shake stabilization lens velocity) calculated from the difference between the position of the shake stabilization unit 19 acquired at a preceding cycle and the position acquired at the current cycle, and driven by the shake stabilization operation.

At S1606, the adder 1514 adds the motion vector detected by the motion vector detection unit 1007 and the shake stabilization lens velocity which is the output signal of the differentiator 1513. The addition allows for calculating the shake velocity of the camera system 100.

At S1607, the low-pass filter 1204 removes or reduces the high-frequency component of the added signal of the motion vector and the movement velocity of the shake stabilization unit 19.

At S1608, the subtracter 1205 subtracts the output signal of the adder 1514 subjected to processing by the low-pass filter 1204 (i.e., the shake velocity of the camera system 100 from which the high-frequency component has been removed or reduced) from the shake signal subjected to processing by the low-pass filter 1202.

According to the second embodiment, as has been described above, using the signal acquired by adding the motion vector and the movement velocity of the shake stabilization unit 19 for offset estimation allows for estimating the offset even when image stabilization is performed.

Note that the aforementioned embodiments employ a type of image stabilization section that shift-drives a part of the imaging optical system. However, the present invention is not limited thereto, and the image stabilization section may be one that shift-drives the image sensor 6, tilt-drives the lens, or a combination thereof.

Modification Example of First and Second Embodiments

The aforementioned embodiment estimates the offset while changing the Kalman gain of the Kalman filter by the observation noise signal generated based on the absolute value of the output signal of the high-pass filter 1206. Accordingly, the likelihood of taking over previous estimation results is set to be higher (more difficult to update the offset value) when the object is determined to be moving (when the absolute value of the output signal of the high-pass filter 1206 is equal to or larger than a predetermined value) than when the object is determined not to be moving. However, the manner of estimating the offset is not limited to thereto, and other approaches are conceivable such as using other filters or calculating a weighted average based on absolute values of output signals of the high-pass filter 1206. In addition, the offset value may be updated when the absolute value of the output signal of the high-pass filter 1206 is lower than a predetermined value, or the offset value may not be updated when the absolute value is equal to or higher than the predetermined value. In addition, when the absolute value of the output signal of the high-pass filter 1206 is equal to or larger than the first predetermined value, the offset value may not be updated with the Kalman gain $k_t$ being set to 0, or, when the absolute value is lower than the first predetermined value and equal to or larger than the second predetermined value, the Kalman filter may have the Kalman gain $k_t$ set to be $0<k_t<1$, and, when the absolute value is lower than the second predetermined value, the Kalman gain $k_t$ may be set to 1.

Third Embodiment

In the third embodiment, there will be described a method for estimating the offset value when the shift shake component in the shake of the camera is large.

For example, Japanese Patent Laid-Open No. 2005-43780 discloses a technique for modifying the reference value as an output of the shake detection unit in a stationary state in which no shake is being applied to the gyroscope sensor, in accordance with an image movement signal (vector) acquired by analyzing an image captured by the camera.

In the modification of the reference value of the oscillation detection unit disclosed in Japanese Patent Laid-Open No. 2005-43780, a motion vector between images captured at two different time points is used, whereby, when shake includes only rotational blur, it is possible to use the amount of rotational blur of the camera estimated from the image motion vector as the true value.

However, shift (translation) blur is known to be applied to the camera besides rotational blur, and its effect is large and cannot be ignored under a condition such as a large image magnification or a condition such as a long imaging time.

When the technique of Japanese Patent Laid-Open No. 2005-43780 is applied to a captured image with a large shift blur component, an offset component which is not inherently included in the gyroscope sensor may be detected as an offset, whereby the offset component cannot be effectively removed.

In the present embodiment, there will be described a method for solving the aforementioned problem.

In the third embodiment, the configuration of the camera system (image capturing system) 100 is similar to the configuration of the first embodiment illustrated in FIGS. 1A and 1B, and therefore description thereof is omitted.

Figure 7:
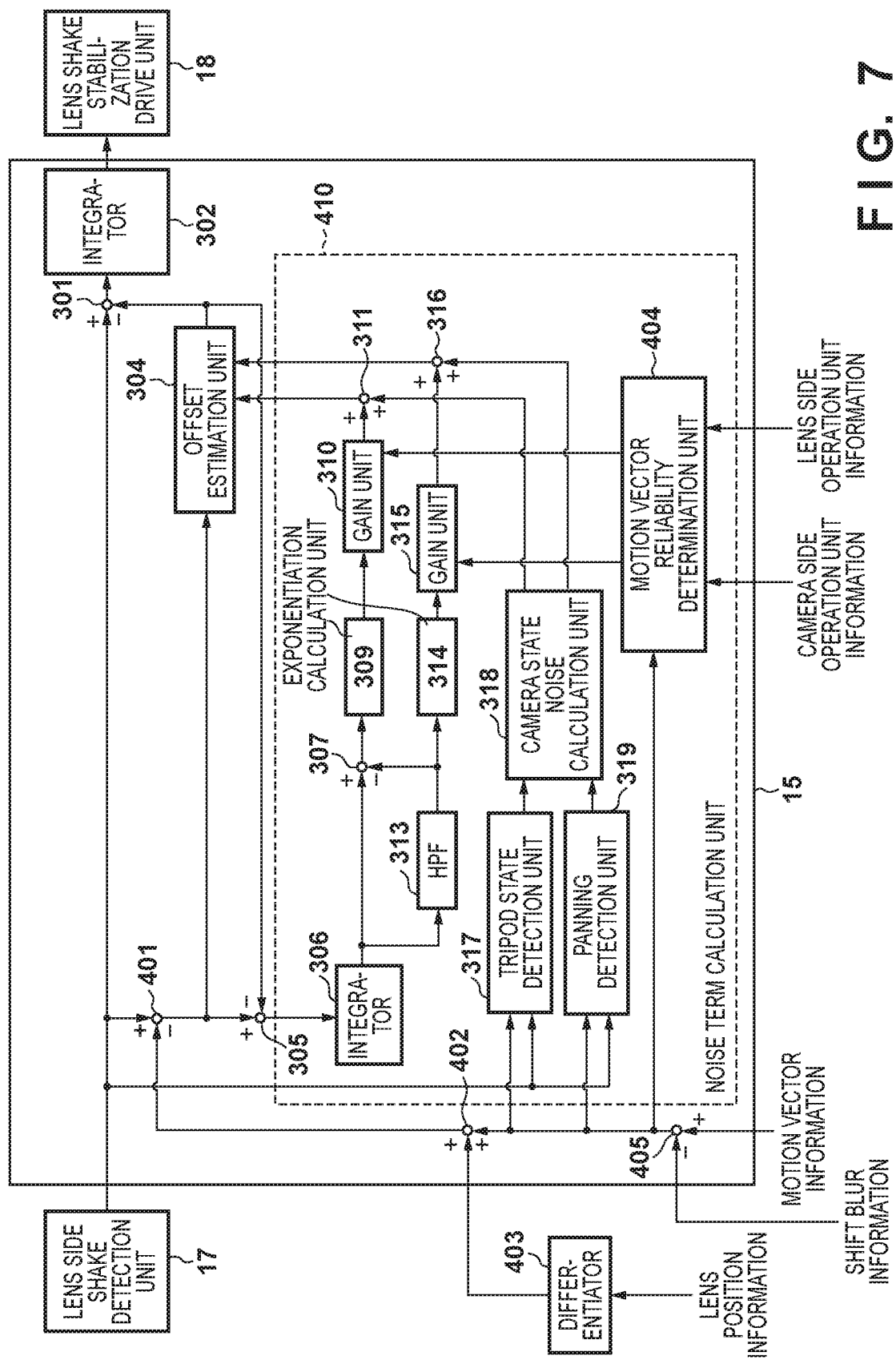
FIG. 7 is a block diagram illustrating a configuration of a lens system control unit according to a third embodiment.

FIG. 7 is a block diagram illustrating a detailed configuration of a part that conducts image stabilization control in the lens system control unit 15 according to the present embodiment. Each block illustrated in FIG. 7 is realized by executing, by the lens system control unit 15, a program stored in the memory 25. Note that control of image stabilization is the same for both the Pitch direction and the Yaw direction and therefore only one of the axes will be described.

In FIG. 7, the output of the lens side shake detection unit 17 is input to the lens system control unit 15. The lens system control unit 15 includes adders 301, 305, 307, 311, 316, 401, 402 and 405, an integrator 302, an offset estimation unit 304, a differentiator 403, and a noise term calculation unit 410. The noise term calculation unit 410 includes an integrator 306, a high-pass filter (HPF) 313, exponentiation calculation units 309 and 314, gain units 310 and 315, a tripod state detection unit 317, a camera state noise calculation unit 318, a panning detection unit 319, and a motion vector reliability determination unit 404.

There will be described a calculation process of the movement target value of the shake stabilization unit 19 in the lens system control unit 15 configured as described above, particularly a configuration in which the offset component (offset amount) of the shake signal detected by the lens side shake detection unit 17 is estimated by the offset estimation unit 304.

The lens system control unit 15 acquires a shake signal from the lens side shake detection unit 17. From the motion vector information calculated by the image processing unit 7 of the camera main body 1, the adder 405 subtracts the shift blur amount calculated by the shift blur calculation unit 23, and removes the shift blur component included in the motion vector information. The adder 402 adds the motion vector information from which the shift blur component has been removed and lens velocity information acquired by differentiating by the differentiator 403 the position information detected by the lens position detection unit 20. The differentiator 403 corresponds to the differentiator 1513 of the embodiment 2. Furthermore, a signal acquired by subtracting, by the adder 401, from the shake signal detected by the lens side shake detection unit 17, the aforementioned lens velocity information and the motion vector information from which the shift blur component has been removed is input to the offset estimation unit 304 and the adder 305. The signal output from the adder 401 corresponds to the signal output from the adder 1205 of embodiment 2, and differs from the latter in that it is not pseudo-integrated by a low-pass filter and that the shift blur component has been removed from the motion vector information.

The offset estimation unit 304 estimates an offset component of the lens side shake detection unit 17 and outputs the result of estimation to the adders 301 and 305. The adder 301 outputs, to the integrator 302, the result of subtracting the offset estimation value from the shake signal detected by the lens side shake detection unit 17. Integrating the input signals by the integrator 302 generates an angle signal of shake and, with the angle signal being the target value, the lens shake stabilization drive unit 18 drives the shake stabilization unit 19 to perform image stabilization.

The lens system control unit 15 according to the present embodiment includes the noise term calculation unit 410, and the offset estimation unit 304 performs offset estimation based on the result of calculation by the noise term calculation unit 410. There will be described a process performed by the noise term calculation unit 410.

The motion vector reliability determination unit 404 determines the reliability of the motion vector, based on the motion vector calculated by the image processing unit 7, image processing information described below, and imaging setting information set by the camera side operation unit 9 and the lens side operation unit 16. Based on the determined reliability information, gain values are set for the gain units 310 and 315 that determine the magnitudes of the system noise and the observation noise to be used for offset estimation by the offset estimation unit 304.

Furthermore, the present embodiment generates a noise calculation shake angle signal by integrating, by the integrator 306, the signals acquired by subtracting, by the adder 305, the offset estimation value from the shake signal. Subsequently, a process for changing the filter characteristics of the offset estimation unit 304 is performed, based on the noise calculation shake angle signal. The noise calculation shake angle signal is acquired by subtracting, by the adder 305 as described above, the offset estimation value acquired by the offset estimation unit 304 from the shake detection signal acquired by the lens side shake detection unit 17.

As will be described in detail below, the offset estimation unit 304 performs a process for estimating an offset component from the shake detection signal by a filtering process with variable frequency characteristics. Accordingly, in a case where the offset value of the shake detection signal has been accurately estimated by the offset estimation unit 304, the value calculated by the adder 305 turns out to be a shake signal without an offset component. Therefore, the noise calculation shake angle information calculated by the integrator 306 turns out to be a value centered on a reference value 0. On the other hand, in a case where the offset has not been accurately estimated by the offset estimation unit 304, the noise calculation shake angle information calculated by the integrator 306 turns out to be a slowly drifting value affected by the offset error of the shake signal of the lens side shake detection unit 17.

The noise calculation shake angle signal generated by the integrator 306 has the low-frequency component removed and the high-frequency component extracted by the high-pass filter 313. The adder 307, on the other hand, extracts the low-frequency component by subtracting the high-frequency component from the noise calculation shake angle signal. In the aforementioned manner, the noise calculation shake angle signal is separated into a low-frequency component and a high-frequency component.

Here, the cutoff frequency of the high-pass filter 313 is set so as to cut the frequency band including the offset component, low-frequency fluctuation, and drift component of the lens side shake detection unit 17. The aforementioned approach allows for separating the low-frequency offset component desired to be estimated among the shake signals detected by the lens side shake detection unit 17, and the high-frequency shake component being generated by actual shake. The low-frequency component of the noise calculation shake angle signal calculated in the aforementioned manner is squared by the exponentiation calculation unit 309 to calculate its absolute value. Furthermore, an evaluation value of the low-frequency shake angle mainly representing the magnitude and influence of the offset component and the drift component of the low-frequency shake detection signal is calculated by integrating a predetermined gain by the gain unit 310. The evaluation value is referred to as a system noise term.

On the other hand, a high-frequency component of the noise calculation shake angle signal calculated by the high-pass filter 313 is squared by the exponentiation calculation unit 314 to calculate its absolute value. Furthermore, a high-frequency shake angle evaluation value representing the magnitude of a high-frequency shake generated by the photographer's motion is calculated by integrating a predetermined gain by the gain unit 315. The evaluation value is referred to as an observation noise term.

As has been described above, when the offset estimation value provided by the offset estimation unit 304 is not accurate, the low-frequency component of the noise calculation shake angle signal after integration may drift and increase, which results in an operation of increasing the system noise term.

Furthermore, the tripod state detection unit 317 determines, according to a known method, whether or not the camera in a static state as though being attached to a tripod, or a state with less shake (referred to as tripod state). The shake amount of the image capturing apparatus 1 is detected by, for example, the shake information detected by the lens side shake detection unit 17, or the motion vector information calculated by the image processing unit 7. Subsequently, the camera is determined to be in the tripod state in a case where the state in which the shake amount is less than a predetermined value (within a predetermined amplitude) has been continuing for a predetermined period. In a case where the camera is determined to be in the tripod state, the adder 311 performs a process of adding the value preliminarily set by the camera state noise calculation unit 318 to the system noise term as tripod detection state noise.

On the other hand, the panning detection unit 319 determines whether or not the photographer has performed composition change such as panning or tilting (changing the orientation of the camera), according to a known method. For example, the panning detection unit 319 detects the shake amount of the image capturing apparatus 1, based on the shake information detected by the lens side shake detection unit 17 or the motion vector information calculated by the image processing unit 7. Subsequently, in a case where the state in which the shake amount is larger than a predetermined value has been continuing for a predetermined time, the panning detection unit 319 determines that the photographer has performed panning or tilting. Upon detecting a panning state, the adder 316 performs a process of adding the value preliminarily set by the camera state noise calculation unit 318 to the observation noise term as panning detection state noise.

The acquired system noise term and the observation noise term are output to the offset estimation unit 304 to be used for offset estimation by the offset estimation unit 304.

In addition, as has been described above, using not only the information provided by the lens side shake detection unit 17 but also the motion vector information to detect the tripod state and the panning operation allows for performing a more accurate detection. In other words, detecting a change of motion such as a slow panning operation which is difficult to detect by the lens side shake detection unit 17 using the motion vector based on matching comparison at the pixel level allows for accurately detecting a shake. However, the present embodiment is not limited to the aforementioned embodiment, and it is intended that detection of the tripod state and the panning operation may be performed without using the motion vector information.

<Shift Blur Calculation Technique: Use of Gyroscope and Acceleration Sensor>

Figure 8:
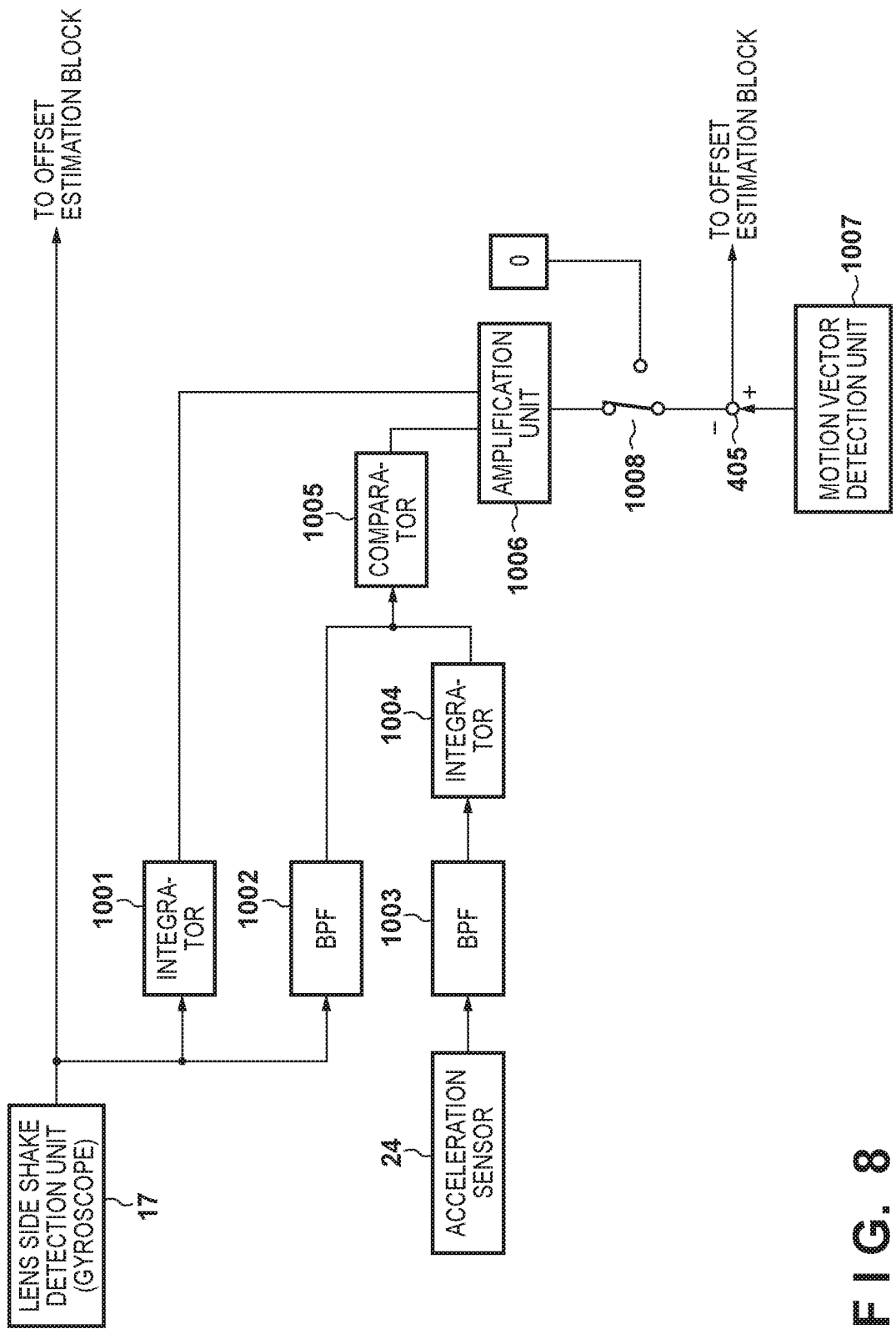
FIG. 8 is a block diagram illustrating a configuration of a shift blur calculation unit.

Next, there will be described a calculation technique of the shift blur performed by the shift blur calculation unit 23 according to the present embodiment, referring to FIG. 8. FIG. 8 is a block diagram describing a configuration of the shift blur calculation unit 23 according to the present embodiment. The block diagram depicts a part that uses the adder 405 of FIG. 7 to subtract a signal corresponding to the shift blur acquired from the acceleration sensor 24 from the motion vector information acquired from the motion vector detection unit 1007. In addition thereto, the lens side shake detection unit 17 is also illustrated. Here, the motion vector detection unit 1007 is provided inside the image processing unit 7 of FIG. 1B.

The rotational angular velocity acquired by the lens side shake detection unit 17 is transmitted to the block including the offset estimation unit 304, and is converted into angle information θ using an integrator 1001. Subsequently, an angular velocity signal is generated by passing through a band-pass filter (BPF) 1002 that passes only a predetermined band including a large amount of shift blur. The acceleration signal output by the acceleration sensor 24 passes through a BPF 1003 having the same band characteristics as the BPF 1002 and is further converted into a velocity signal via an integrator 1004. The angular velocity signal acquired from the BPF 1002 and the velocity signal acquired from the integrator 1004 are input to a comparator 1005 and compared therein. More specifically, the velocity signal is divided by the angular velocity signal. The division causes calculation of a rotation radius L of a rotational motion with the angular velocity acquired from the vibrating gyroscope. The angle signal θ acquired from the integrator 1001 and the rotating radius L acquired from the comparator 1005 are output from the amplification unit 1006 as Lβθ. Here, Lβθ corresponds to the amount of translation, i.e., the amount of the shift blur, at the occurrence of a rotational motion by the rotation angle θ at the rotation radius L under the condition of image magnification β.

A switcher 1008 performs switching so as to connect to the adder 405 when the shift blur amount Lβθ acquired by the amplification unit 1006 is larger than a predetermined amount. When the shift blur amount Lβθ acquired by the amplification unit 1006 is equal to or less than a predetermined amount, the shift blur amount Lβθ is not connected to the adder 405, and instead 0 is input. The adder 405 outputs a value resulted from subtracting the shift blur amount or 0 acquired by the amplification unit 1006 from the motion vector information output by the motion vector detection unit 1007, and the value is communicated to a block separately including the offset estimation unit 304, as illustrated in FIGS. 1A and 1B. A more accurate rotational blur amount of the camera system 100 becomes available by subtracting the shift blur amount from the motion vector information. In addition, switching between whether or not to subtract depending on the magnitude of the shift blur amount makes it possible to remove the shift blur amount included in the motion vector information more effectively.

<Description of Flowchart>

Next, there will be described a calculation process of the shake target value by the lens system control unit 15, referring to the flowcharts of FIGS. 9A to 9C. Here, the processing at and after step S2 is repeated at a constant cycle.

Step S1 is a step at which the lens system control unit 15 determines to start operation at a predetermined cycle and the process flow proceeds to step S2 when start of operation is determined.

At step S2, the lens side shake detection unit 17 detects the shake of motion occurring in the camera system 100 and outputs a shake signal. The present step is similar to step S1301.

Step S3 is a step for determining, by the lens system control unit 15, whether or not the acquisition cycle of a motion vector calculated by the image processing unit 7 has come around and, when the acquisition cycle has come around, the process flow proceeds to step S4, at which a motion vector is acquired. The present step is similar to step S1303. The detection cycle of the motion vector according to step S3 comes for each frame rate (e.g. 30 Hz or 60 Hz). When, on the other hand, the cycle of motion vector detection to be executed by the image processing unit 7 for each frame rate has not come around yet, the process flow proceeds to step S9, at which the motion vector information acquired in the previous cycle is held.

At step S5, the shift blur amount calculated by the shift blur calculation unit 23 is subtracted from the motion vector information. At step S6, the lens position detection unit 20 detects and acquires the position of the shake stabilization unit 19. The acquisition cycle, which will be described below, is set by the lens system control unit 15 so that acquisition of the position, which will be used in summing with the motion vector information, is performed with a frequency equal to or higher than the motion vector acquisition cycle determined at step S3.

At step S7, the motion vector reliability determination unit 404 determines, based on image processing information described below and the imaging setting information set by the camera side operation unit 9 and the lens side operation unit 16, the reliability of the motion vector calculated by the image processing unit 7.

Furthermore, at step S8, the gain values of the gain units 310 and 315 are set, based on the reliability information of the motion vector determined by the motion vector reliability determination unit 404.

At step S10, the lens system control unit 15 determines whether or not the execution cycle of the offset estimation process has come around, and the process flow proceeds to step S11 when the execution cycle has come around. When, on the other hand, it is determined that the execution cycle of the offset estimation process has not come around yet, the process flow proceeds to step S38, at which the offset estimation value estimated in the previous offset estimation execution cycle is held, and subsequently the process flow proceeds to step S39.

At step S11, the differentiator 403 performs a differential process on the detected position of the shake stabilization unit 19 acquired by the lens position detection unit 20, and the detected position is converted into a shake stabilization lens velocity by calculating the derivative value. Note that, although the lens system control unit 15 performs calculation of the shift blur amount at the timing when the position detection unit 20 detects the position of the shake stabilization unit 19, shift blur stabilization corresponding thereto is not performed. The reason is to prevent shortage of stroke during actual exposure, with the process being intended to reduce offset error of the lens side shake detection unit 17 prior to actual exposure by which the present flow actually performs imaging. In other words, the differential value of the detected position of the shake stabilization unit 19 to be calculated by the differentiator 403 at step S11 is intended as the drive velocity for stabilizing only the rotational shake, without including the shift stabilization component. Here, the processing of the present step corresponds to step S1604 of the second embodiment.

When the lens shake stabilization drive unit 18 is performing the shake stabilization operation, the adder 402 adds, at step S12, the motion vector calculated by the image processing unit 7 and the shake stabilization lens velocity. The step is similar to the step S1606 of the second embodiment. As has been described above, the motion vector information is information from which the shift blur amount has been subtracted at step S5. The rotational shake velocity of the camera system 100 is calculated by summing the shake velocity stabilized by shake stabilization and the remaining shake velocity calculated by subtracting the shift blur amount from the motion vector. In the absence of shake stabilization, the shake stabilization lens velocity is 0 and therefore the difference between the motion vector information and the shift blur amount turns out to be directly detecting the rotational shake of the camera system 100, without having to add the shake stabilization lens velocity.

The shake velocity of the camera system 100 calculated using the motion vector as described above turns out to be directly and accurately detecting the shake of the camera system 100 with less offset error than the detected value by the lens side shake detection unit 17. Therefore, subtracting, by the adder 401 at step S13, the rotational shake velocity of the camera system 100 from the shake amount of the lens side shake detection unit 17 allows for accurately separating the offset of the lens side shake detection unit 17. In addition, subtracting the shift blur amount from the motion vector information allows for detecting a rotational shake of the camera system 100 more accurately. The present step corresponds to step S1608 of the second embodiment, but differs from step S1608 in that the shake velocity of the camera system 100 to be subtracted has been subjected to the process of reducing the shift blur component (step S5 described above).

On the other hand, the motion vector calculates an image shift by comparing an image preceding by one or more frames with a currently acquired image, and therefore it cannot be calculated in a case where it is essentially impossible to acquire image information. In addition, the calculated motion vector information may not be correct, depending on the capturing condition.

Accordingly, the motion vector information may not be acquired depending on the capturing condition, or the vector information may not be correctly acquired depending on the capturing condition as will be described below. In the present embodiment, therefore, the motion vector reliability determination unit 404 performs a process of determining the reliability of the motion vector information, and changing the relation between the magnitudes of the system noise and the observation noise to be used for offset estimation in accordance with the reliability. The relation between the reliability of the motion vector and the magnitudes of the system noise and the observation noise to be used in the offset estimation will be described below.

At step S14, the adder 305 subtracts the stored value of the offset estimation value which has been estimated by the offset estimation unit 304 and stored at step S38 at the time of performing the previous estimation process from the shake signal from which a particular frequency component has been removed.

At step S15, the integrator 306 calculates the shake angle signal by integrating the shake signal from which the offset estimation value has been subtracted by the adder 305. Although the integrator 306 performs a simple numerical integration process, it may be configured to perform a pseudo integration process including a low-pass filter. A pseudo integration process refers to an integration process configured not to integrate low-frequency components equal to or lower than a known particular cutoff frequency. When the offset estimation value subtracted from the shake signal by the adder 305 is significantly far from the true offset, the integrated shake angle signal will significantly drift. Accordingly, there is a possibility that the calculated value of the system noise term or the observation noise term described above may overflow during calculation, and therefore it is preferred to configure the integration process with a pseudo integral to reduce the amount of drift. The offset estimation value provided by the offset estimation unit 304 is estimated to approach the true offset value over time, as will be described below, and therefore the integration process may also be configured so that the cutoff frequency of the pseudo integral is replaced by a low frequency as estimation of the offset estimation value proceeds.

At step S16, the high-pass filter 313 removes the low-frequency component from the shake angle signal and extracts the high-frequency component.

At step S17, the exponentiation calculation unit 314 squares the high-frequency component of the shake angle signal, and the gain unit 315 further multiplies it by a predetermined gain at step S18 to calculate the evaluation value and hold the result as the observation noise term at step S19.

At step S20, the low-frequency component of the shake angle signal is calculated by subtracting, by the adder 307, the high-frequency component of the shake angle signal calculated by the high-pass filter 313 from the angular shake signal calculated by the integrator 306.

At step S21, the exponentiation calculation unit 309 squares the low-frequency component of the shake angle signal, and the gain unit 310 further multiplies it by a predetermined gain at step S22 to calculate the evaluation value and hold the result as the system noise term at step S23.

Here, the camera state noise calculation process is performed at a cycle determined by the lens system control unit 15 at step S24, in parallel with the offset estimation execution cycle determined by the lens system control unit 15 at step S10. The cycle of the camera state noise calculation may be the same as or different from the offset estimation cycle. When it is determined at step S24 that the camera state noise calculation cycle has not come around yet, the process flow proceeds to step S33, at which the tripod detection state noise calculated in the previous camera state noise calculation cycle is stored. Furthermore, the process flow proceeds to step S35 after the previous panning detection state noise has been stored at step S34.

When, on the other hand, the lens system control unit 15 has determined at step S24 that the camera state noise calculation cycle has come around, the process flow proceeds to step S25. At step S25, the tripod state detection unit 317 performs detection of the tripod state, depending on whether or not the state in which the shake of the camera system 100 is small has been continuing for a predetermined period or longer, based on the amount of angular velocity shake acquired at step S2 and the motion vector acquired at step S4.

At step S26, the camera state noise calculation unit 318 determines whether or not the tripod state has been detected. When the tripod state has been detected, a predetermined value is set to the tripod detection state noise at step S27, or the tripod detection state noise which has been set in the previous calculation cycle is zero-cleared at step S28 when the tripod state has not been detected.

At step S29, detection of panning or tilting operation is performed, based on the angular velocity shake amount acquired at step S2 and the motion vector acquired at step S4 by the panning detection unit 319.

At step S30, the camera state noise calculation unit 318 determines whether or not the panning state has been detected. When panning has been detected, a predetermined value is set to the panning detection state noise at step S31, or the panning detection state noise which has been set in the previous calculation cycle is zero-cleared at step S32 when panning has not been detected.

Subsequently, the process flow proceeds to step S35 after the lens system control unit 15 has stored the previous tripod detection state noise and the previous panning detection state noise at steps S33 and S34, respectively.

At step S35, the adder 316 adds the panning detection state noise to the observation noise term. At step S36, the adder 311 adds the tripod detection state noise to the system noise term. At step S37, an offset estimation calculation described below is performed by the offset estimation unit 304, based on the aforementioned information.

At step S38, the lens system control unit 15 holds the offset estimation value calculated by the offset estimation unit 304 at step S37. At step S39, the adder 301 subtracts the offset estimation value from the amount of angular velocity shake. At step S40, the integrator 302 generates a target value for the lens shake stabilization drive unit 18 by performing an integration process to generate a shake angle signal. Note that the filtering process by the integrator 302, similarly to the integrator 306 described above, may be configured to include a pseudo integral so that the cutoff frequency of the pseudo integral is replaced by a low frequency as estimation of the offset estimation value proceeds.

Finally, at step S41, the lens system control unit 15 terminates the shake target value calculation process of the current calculation cycle.

<Details of Offset Estimation Unit>

Next, there will be described a method for offset estimation processing of the lens side shake detection unit 17 performed by the offset estimation unit 304, referring to mathematical formulae. When forming the offset estimation unit 304 using a known linear Kalman filter, a general formula of the linear Kalman filter may be represented by Formulae (1) to (7) as has been explained in the embodiment 1, and a model of offset can be expressed by the linear model of Formulae (8) and (9) described above.

Here, the variance Ex of noise in the operation model in Formula (4) is expressed by sum of the system noise σx and tripod detection state nose σtri, and the variance Σz of noise of the observation model in Formula (5) is expressed by sum of the observation noise σt and panning detection state noise σp. Furthermore, letting $\hat{x}^-$ be the offset a-priori estimation value, $\hat{P}_t$ be the error covariance estimation value at a time point t, $k_t$ be the Kalman gain at the time point t, σt be the observation noise, σp be the panning detection state noise, and $z_t$ be the shake amount observed by the lens side shake detection unit 17, the Kalman filter can be implemented by the following formulae.

$$\hat{x}_t^- = \hat{x}_{t-1} \quad \text{Formula (15)}$$

$$\hat{P}_t^- = \hat{P}_{t-1} + \sigma_x + \sigma_{tri} \quad \text{Formula (16)}$$

$$k_t = \frac{\hat{P}_t^-}{(\hat{P}_t^- + \sigma_t + \sigma_p)} \quad \text{Formula (17)}$$

$$\hat{x}_t = \hat{x}_t^- + k_t(z_t - \hat{x}_t^-) \quad \text{Formula (18)}$$

$$\hat{P}_t = (I - k_t)\hat{P}_t^- \quad \text{Formula (19)}$$

The offset estimation unit 304, which is implemented by arithmetic expressions from Formula (15) to Formula (19) described above, calculates an offset a-priori estimation value $\hat{x}^-$ and an error covariance a-priori estimation value $\hat{P}_t^-$ from the offset estimation value $\hat{x}_{t-1}$ and the system noise ax at a time point t−1 of the update cycle of estimation calculation, the tripod detection state noise σtri, and the error covariance estimation value $\hat{P}_{t-1}$ at the time point t−1. Subsequently, the Kalman gain $k_t$ is calculated based on the error covariance a-priori estimation value $\hat{P}_t^-$, the observation noise at output from the adder 316, and the panning detection state noise σp. Subsequently, according to Formula (18), the offset a-priori estimation value $\hat{x}^-$ is modified by a value acquired by multiplying the error between the observed shake amount $z_t$ and the offset a-priori estimation value $\hat{x}^-$ by the Kalman gain $k_t$, whereby the offset estimation value $\hat{x}_t$ is calculated. Additionally, the error covariance a-priori estimation value $\hat{P}_t^-$ is modified according to Formula (19), whereby an error covariance estimation value $\hat{P}_t$ is calculated. The offset estimation value is calculated by repeatedly updating and modifying the a-priori estimations by the aforementioned calculation at each calculation cycle.

With regard to the Kalman filter implemented as described above, there will be described variation of the offset estimation operation of the Kalman filter due to variation of the magnitudes of the system noise ax, the observation noise at, the tripod detection state noise σtri, and the panning detection state noise op, referring to Formulae (16), (17) and (18), and FIGS. 10A to 10D. FIGS. 10A to 10D illustrate the relations between the magnitude of shake and the magnitudes of system noise, observation noise, tripod detection state noise, and panning detection state noise, respectively, depending on imaging state.

<Effect of System Noise and Tripod Detection State Noise>

Figure 10A:
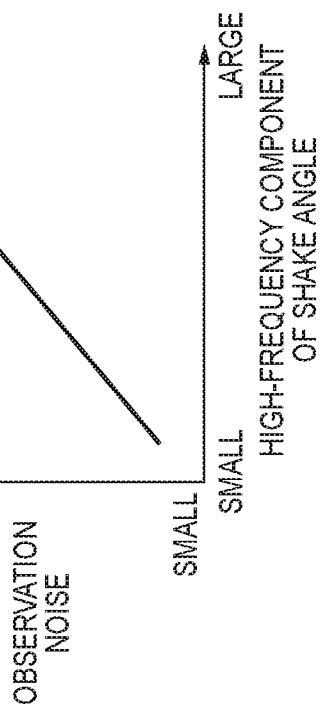
FIGS. 10A to 10D illustrate a relation between the magnitude of shake applied to the camera system and the magnitudes of system noise, observation noise, tripod detection state noise and panning detection state noise.

First, as illustrated in FIG. 10A, the system noise σx increases as the low-frequency component of the shake angle signal calculated by the integrator 306 increases. The foregoing indicates that the offset value of the lens side shake detection unit 17 and the offset estimation value subtracted by the adder 305 still has an error, and therefore a large drift exists in the low-frequency component of the shake angle signal for noise calculation after integration by the integrator 306. In other words, the foregoing indicates that the offset estimation unit has failed to correctly estimate the offset.

Figure 10B:
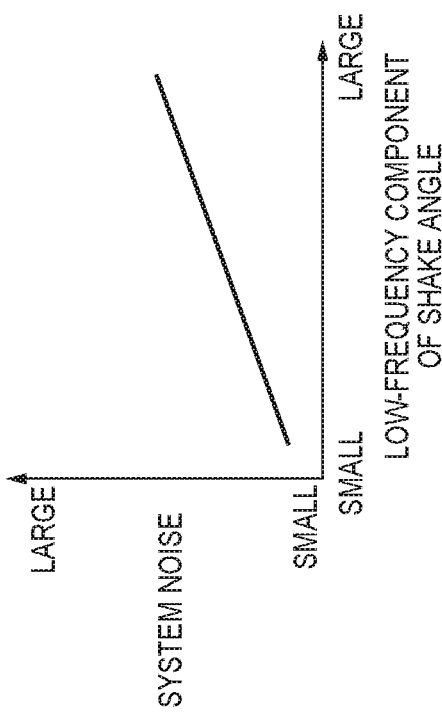
Figure 10C:
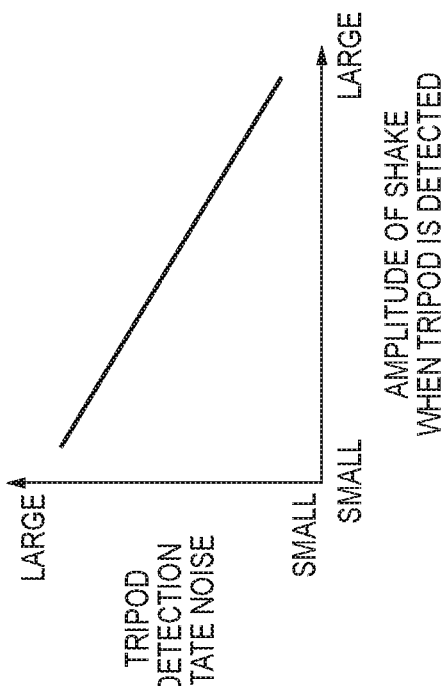

Next, as illustrated in FIG. 10C, the tripod detection state noise is increased as the shaking state when the tripod is detected by the tripod state detection unit 317 decreases. The foregoing indicates that the camera system 100 is in a static state such as being placed on a tripod.

The system noise and the tripod detection state noise first cause the value of the error covariance a-priori estimation value $\hat{P}_t^-$ to increase in Formula (16). Considering a state in which the observation noise and the panning detection state noise has not changed, the Kalman gain $k_t$ calculated by Formula (17) approaches 1 as the proportion of the numerator becomes larger in comparison with the denominator of the calculating expression. On the contrary, the Kalman gain $k_t$ calculated by Formula (17) approaches 0 as the system noise and the tripod detection state noise decrease. From the foregoing, the offset estimation value $\hat{x}_t$ calculated by Formula (18) is corrected so as to approach the observed shake amount zt as the Kalman gain approaches 1, and updated so as to maintain the offset a-priori estimation value $\hat{x}^-$ as the Kalman gain approaches 0. Such an operation causes the Kalman gain to approach 1 in the offset estimation calculation by the offset estimation unit 304 at step S37 while the offset error of the lens side shake detection unit 17 is large, or while the offset estimation value has an error from the true offset value. The foregoing serves to update the offset estimation value so as to correct the error between the observed shake amount and the estimation value according to Formula (18). In addition, the Kalman gain approaches 1 because the variance of noise of the operation model in Formula (16) further increases as the amplitude of shake in the tripod detection state decreases. The foregoing works to cause the offset estimation value to approach the observed shake amount. This is because no shake frequency component induced by the shake of the actual photographer is included in the observed shake amount, provided that shake is small in the tripod state, and therefore the low-frequency component in the observed shake amount mainly includes the offset component, which results in a higher precision of the offset estimation. Therefore, the update process is performed so as to positively bring the estimation value of the offset closer to the observed shake amount.

<Effect of Observation Noise, Panning Detection State Noise>

First, as illustrated in FIG. 10B, the observation noise σt increases as the high-frequency component of the shake angle signal calculated by the integrator 306 increases. The foregoing indicates that the high-frequency component including the camera shake frequency band is relatively large in the shake amount detected by the lens side shake detection unit 17. In other words, the foregoing indicates that the camera system 100 is being held under a capturing condition with a large shake, such as capturing while walking.

Figure 10D:
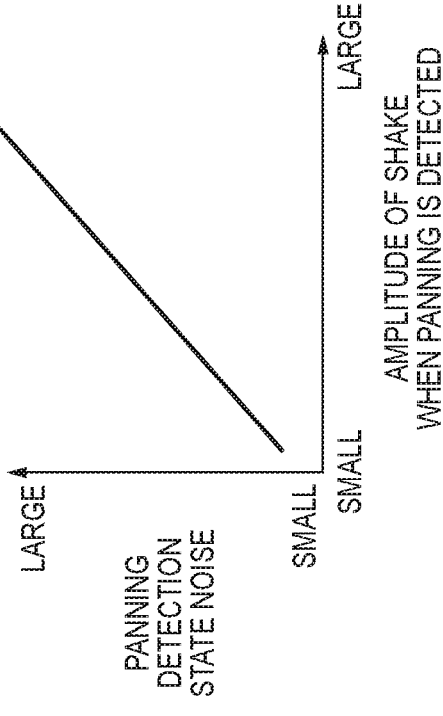

Next, as illustrated in FIG. 10D, the panning detection state noise is caused to increase as the shake state during panning detection by the panning detection unit 319 increases. The foregoing indicates a state in which the photographer is intentionally performing a panning or tilting operation to change the composition, whereby the camera system 100 is being significantly shaken. Although determination by panning detection can be replaced by determination by an observation noise in that the shake is large, there is a merit that the precision of detecting a change of motion is higher than a case of simply observing the magnitude of shake in a panning operation, which is a motion in a constant direction during a predetermined period.

Considering a state in which the system noise and the tripod detection state noise has not changed, the value of the error covariance a-priori estimation value $\hat{P}_t^-$ does not change in Formula (16). The Kalman gain $k_t$ calculated by Formula (17) approaches 0 as the proportion of the denominator grows larger than the numerator of the calculating expression when the observation noise and the panning detection state noise increases. On the contrary, the Kalman gain $k_t$ calculated by Formula (17) approaches 1 as the observation noise and the panning detection state noise decreases.

As has been described above, the offset estimation value $\hat{x}_t$ calculated by Formula (18) is corrected so as to approach the observed shake amount $z_t$ as the Kalman gain approaches 1. In addition, the offset estimation value is updated so as to maintain the offset a-priori estimation value $\hat{x}^-$, as the Kalman gain approaches 0. Such an operation causes the Kalman gain to approach 0 in the offset estimation calculation performed by the offset estimation unit 304 at step S37, as the shake amount detected by the lens side shake detection unit 17 increases. The foregoing serves to slow down updating (or skip updating) the offset estimation value so as not to correct the error between the observed shake amount and the estimation value according to Formula (18). Also when a panning operation is similarly detected, the Kalman gain approaches 0 due to a further increase of variance of the noise in the observation model in Formula (17), which serves to slow down updating of offset estimation. The offset estimation unit operating in the aforementioned manner allows for avoiding erroneously extracting, as an offset, a shake component induced by the photographer's motion, even under a capturing condition such that a large shake induced by the photographer's motion is included in the shake amount detected by the lens side shake detection unit 17. Therefore, it is possible to accurately perform offset estimation, regardless of the capturing condition or state.

In addition, updating of the offset estimation is hastened in the static state, such as the tripod state, of the image capturing apparatus, and updating of offset estimation is hastened in a state in which the offset estimation value has a large error from the true offset value, such as immediately after the camera system 100 is powered on. Accordingly, it is possible to improve the performance of shake stabilization by avoiding erroneous estimation while accelerating the velocity until offset estimation is completed.

FIGS. 11A and 11B, FIGS. 12A and 12B, and FIGS. 13A and 13B illustrate an example of time series variation of the offset estimation value in each capturing condition as described above.

Figure 11A:
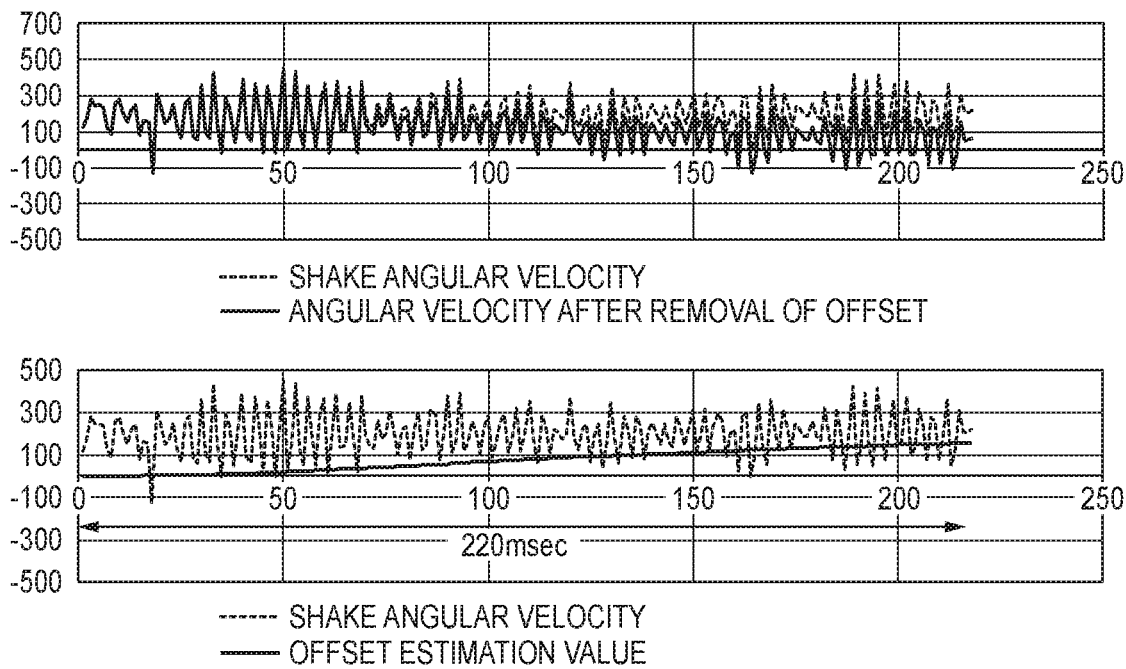
FIGS. 11A and 11B are time-series variation charts of a shake angular velocity signal, an offset estimation value, and the shake angular velocity signal after the offset estimation value being subtracted therefrom.
Figure 11B:
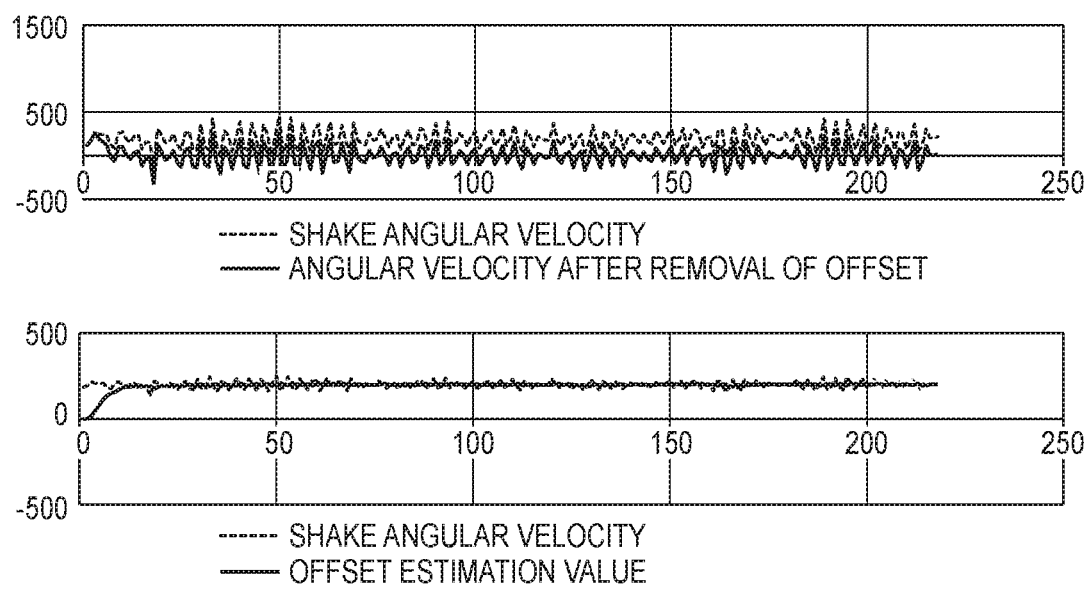

FIGS. 11A and 11B illustrate a time-series variation of the shake angular velocity signal detected by the lens side shake detection unit 17, the offset estimation value, and the shake angular velocity signal after the offset estimation value has been subtracted therefrom, with the horizontal axis indicating time [msec] in a static state in which the camera system is placed on the tripod.

FIG. 11A illustrates a waveform example of a case where the offset of the shake detection sensor according to the conventional approach has been extracted by a low-pass filter with a fixed cut-off frequency and the offset has been removed therefrom, and FIG. 11B illustrates a waveform example of a case using the approach of the present embodiment.

According to the conventional approach, the offset is estimated using a low-pass filter with a very low cutoff frequency (e.g., 0.01 Hz, etc.) in order to improve the low frequency performance of shake stabilization. Accordingly, as illustrated in FIG. 11A, there is a problem that removing the offset from the offset estimation value takes about 220 msec, which is very time consuming, whereby the shake stabilization performance may remain low until the offset succeeds to be properly removed.

On the contrary, in the present embodiment, the capturing-induced shake frequency component has been preliminarily removed from the value of the shake angular velocity used for offset estimation, in a case where the reliability of the motion vector is high, as illustrated in the lower graph of FIG. 1B. Accordingly, it is possible to set the system noise to be large and the observation noise to be small, increasing the update rate of offset estimation thereby.

Next, FIGS. 12A and 12B illustrate a waveform example under a capturing condition with a large shake, such as capturing while walking.

FIG. 12 illustrates a waveform example according to the conventional approach. In a state with a large shake, the cutoff frequency of the low-pass filter is set higher than in the static state for removing the low-frequency component, in order to prevent abutting against the control edge of the shake stabilization member. Therefore, as illustrated in the figure, the offset estimation value acquired by the low-pass filter turns out to be an offset estimation value that exhibits a large variation in the amplitude direction in a time series including not only the fixed-value offset component to be removed, but also the frequency component induced by capturing shake. As a result, the angular velocity after removal of the offset has a frequency component other than the offset, which is a capturing-induced shake component inherently desired to be shake stabilized, removed from the shake detection value, and therefore exhibits a lower performance of shake stabilization.

On the other hand, FIG. 12B is a waveform example according to the present embodiment, from which it can be seen that a similar effect to the case of FIG. 11B is acquired.

Figure 13A:
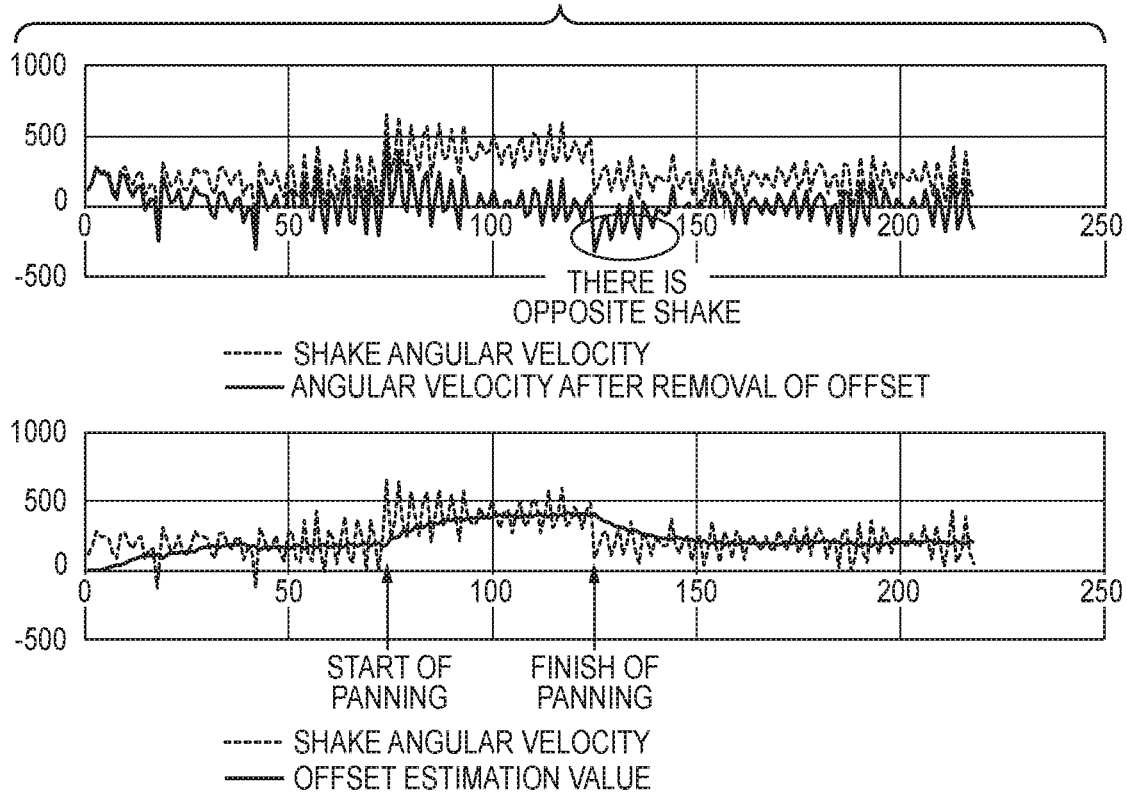
FIGS. 13A and 13B are time-series variation charts of a shake angular velocity signal, an offset estimation value, and the shake angular velocity signal after the offset estimation value being subtracted therefrom.
Figure 13B:
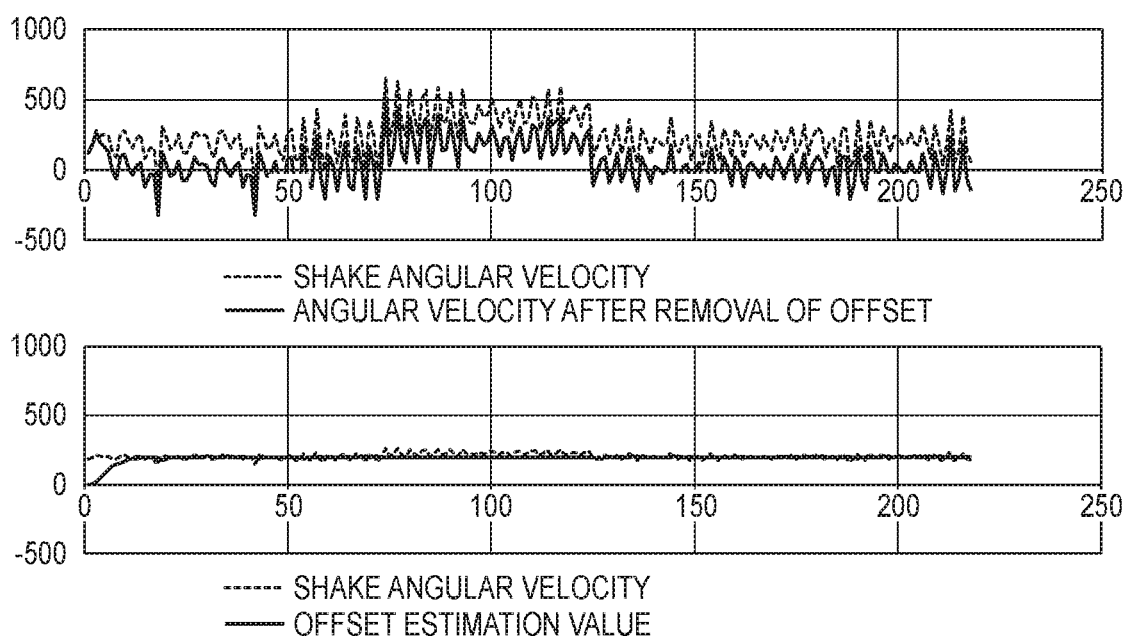

Next, FIGS. 13A and 13B illustrate a waveform example when the composition is changed by the photographer's panning operation.

FIG. 13A is a waveform example according to the conventional approach. The photographer's assumed motion is to perform panning in one direction at about 70 msec relative to the horizontal axis time of the graph and stopping at about 120 msec. Although shake stabilization is successfully performed in a static state in the conventional method, it turns out that also the angular velocity change during panning is erroneously extracted as an offset simultaneously to the start of panning, taking much time to return to the correct offset after panning has stopped. Therefore, it turns out that the angular velocity value after removal of the offset is calculated as a shake angular velocity change in a direction opposite to the panning direction after panning has stopped. This opposite shake results in a failed shake stabilization, i.e., the so-called reverse shake.

On the other hand, in the waveform example according to the present embodiment of FIG. 13B, the angular velocity change caused by a panning motion is detected by the motion vector, and the detected value is removed from the shake angular velocity used in offset estimation, whereby it is possible to further increase the precision of offset estimation.

Next, there will be described the relation between the reliability of the motion vector, and the magnitudes of the system noise and the observation noise, respectively, to be used for offset estimation, referring to FIGS. 14A and 14B.

Figure 14A:
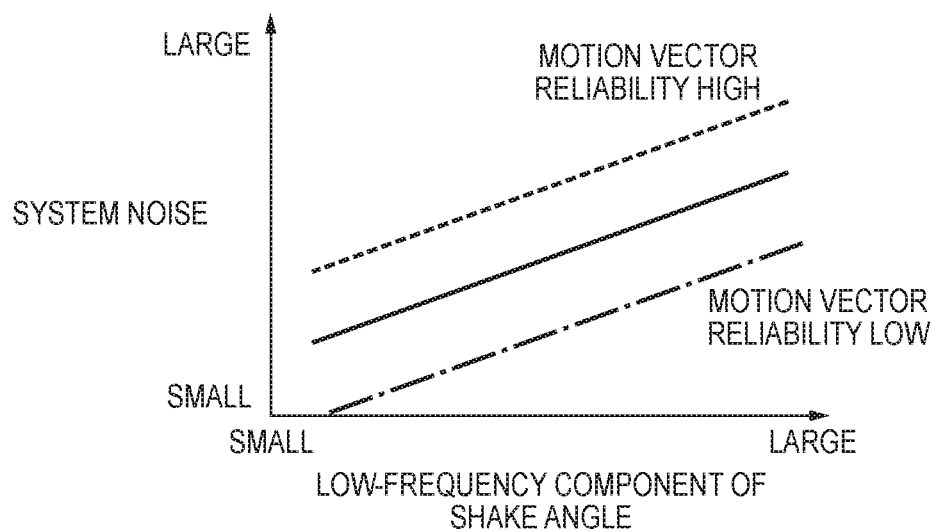
FIGS. 14A and 14B illustrate a relation between the reliability of the motion vector and the magnitudes of system noise, and a relation between the reliability of the motion vector and observation noise, respectively.
Figure 14B:
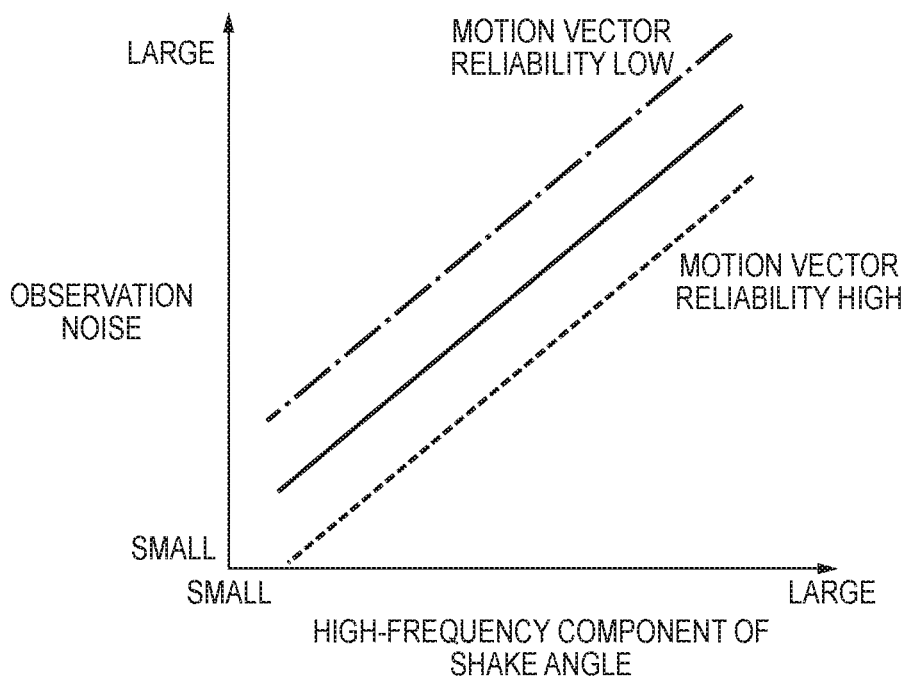

FIG. 14A illustrates the relation between the magnitude of the low-frequency component of the noise calculation shake angle information calculated by the gain unit 310 and the system noise. FIG. 14B illustrates the relation between the magnitude of the high-frequency component of the noise calculation shake angle information calculated by the gain unit 315 and the observation noise. The solid line represents the magnitude of the system noise and the observation noise when not using the motion vector information, the dotted line indicates a case where the reliability of the motion vector is determined to be high, and the dot and dash line represents a case where the reliability of the motion vector is determined to be low.

Although an example of a case not using the motion vector information is omitted here, there may be mentioned a method such as using a band-limiting filter to estimate an offset from a gyroscope signal with the main band of camera shake removed therefrom. In the present embodiment, although a description is provided excluding a method for estimating such an offset, the present invention is not limited thereto and may further use the motion vector information while using a band limited filter.

When the reliability level of the motion vector is determined to be high by the motion vector reliability determination unit 404, the system noise is set to be larger, and the observation noise is set to be smaller than the case of a low reliability for the same noise calculation shake angle signal value. This is because a high reliability of the motion vector allows for accurately detecting the shake of the camera system 100, which is calculated by the adder 401. It is possible to accurately separate the offset component of the lens side shake detection unit 17 by subtracting, from the amount of shake including the shake caused by the image capturing operation detected by the lens side shake detection unit 17 as has been described above, the shake of the camera system 100 calculated from the motion vector. Accordingly, the frequency component of the offset component of the lens side shake detection unit 17 can be extracted from the observed shake amount $z_t$ input to the Kalman filter in Formula (18). Therefore, stabilization is performed in a manner bringing the Kalman gain closer to 1 so that the offset estimation value approaches the observed shake, by increasing the system noise or reducing the observation noise.

When, on the other hand, the reliability of the motion vector is determined to be low by the motion vector reliability determination unit 404, the system noise is set to be smaller, and the observation noise is set to be larger than the case of a high reliability for the same noise calculation shake angle signal value. This is because a low reliability of the motion vector results in a large error in the shake of the camera system 100 calculated by the adder 401, preventing accurate detection thereby. Therefore, subtracting, from the amount of shake including the shake caused by the image capturing operation detected by the lens side shake detection unit 17, the shake of the camera system 100 calculated from the motion vector results in a shake signal with motion vector detection errors superimposed other than the offset component of the lens side shake detection unit 17. Reducing the system noise or increasing the observation noise in Formula (18) brings the Kalman gain close to 0 and slows down updating of the offset estimation value. Alternatively, skipping updating allows for improving the update rate and precision of the offset estimation value.

Next, there will be described below a condition for determining a low reliability with regard to the aforementioned motion vector reliability determination by the motion vector reliability determination unit 404.

(1) A case where a moving object occupies a predetermined or larger portion of the entire captured image:

Although the present embodiment intends to detect the shake of the camera system by the motion vector, it may happen that, when there exists an object moving in the captured image and the moving object occupies the entire image capturing screen, the motion vector detects the movement velocity of the moving object.

(2) A case where the ISO sensitivity setting set by the photographer by the camera side operation unit 9 is higher than a predetermined value:

As is known, raising the ISO sensitivity setting may also amplify the noise component when amplifying the electrical signal by an image capturing unit, and therefore the higher the ISO sensitivity is set, the more the noise is mixed into the motion vector detected from the image, resulting in a decreased reliability of the motion vector.

(3) A case where the contrast value of the object is lower than a predetermined value:

When performing a matching process by a known block matching when calculating a motion vector, a low contrast makes it difficult to determine similar points in the image, which may induce an error in the matching result.

(4) A case where an object having a repeating pattern occupies a predetermined or larger portion of the entire captured image:

When there exists a periodic pattern in the image (a repeating pattern such as a striped pattern) which occupies the entire captured image, an erroneous motion vector may be detected by the block matching.

(5) A case where objects occupy a predetermined or larger portion of the entire area of the captured image, with the difference between the distance from the image capturing apparatus to the first object and the distance from the image capturing apparatus to a different object from the first object being equal to or larger than a predetermined value.

The relation between the amount of motion of the image on the imaging plane and the actual movement velocity of the object varies depending on the distance to the object. Accordingly, when an object located far away from, and an object located close to the camera system 100 coexist in an image from which the motion vector is to be detected, and occupy the entire captured image, there may be induced an error in the amount of motion indicated by the motion vector.

(6) A case where the rolling shutter distortion is larger than a predetermined value:

In a case where a CMOS sensor is used in the image capturing unit, capturing a fast-moving object induces a difference between images depending on the difference between acquisition times, and video-capturing a fast-moving object induces a distortion. The known problem may induce an error in detection of the motion vector, when a motion vector is detected using a distorted image.

(7) A case where the maximum value of the correlation value of the texture of the object is low:

In a case where the maximum value of the correlation value between the reference area and the search area of matching is low when detecting the motion vector, the similarity between the reference area and the search area is considered to be low, and therefore the reliability is determined to be low.

(8) A case where the ratio of the difference between the minimum value and the average value of the correlation relative to the difference between the maximum value and the minimum value of the correlation value of the texture of the object is small:

The ratio of the difference between the minimum value and the average value relative to the difference between the maximum value and the maximum value of the correlation value represents the steepness of the correlation value peak and, when the ratio is small, the similarity between the reference area and the search area is considered to be low, and therefore the reliability is determined to be low.

Note that any calculation method may be used for calculating a correlation value, such as the well-known Sum of Absolute Difference, which is abbreviated as SAD hereinafter.

In the camera system 100 of the present embodiment, the offset estimation unit 304 estimates the offset component of the lens side shake detection unit 17 by removing the effect of the shift blur therefrom. On the other hand, it is known that a scene that induces an effect of shift blur is accompanied with a particular condition. Therefore, it is possible in the present embodiment to switch between, under following conditions, whether or not to use the output of the shift blur calculation unit 23 illustrated in FIGS. 9A to 9C, only for the scenes assumed to induce an effect of shift blur.

The first condition is the "capturing time". When capturing, the exposure period is determined in accordance with the capturing time (exposure time) set by the photographer and the camera system 100. The foregoing is performed by the photographer using the camera side operation unit 9 described above, or may be performed by the camera system 100 itself depending on the setting state of the camera system 100. The lens system control unit 15 uses the output of the shift blur calculation unit 23 described in FIGS. 9A to 9C when the capturing time set in the camera main body 1 is longer than a predetermined time, or does not use the output of the shift blur calculation unit 23 when the capturing time is shorter. This is because, even when not performing a macro capturing with an extremely close object distance, the effect of shift blur increases when the shooting time is long, or the effect of shift blur decreases when the capturing time is short.

The second condition is "object distance information". The camera system 100 can acquire, from the captured image acquired from the image sensor 6, object distance information as a distance map via the image processing unit 7. More specifically, the image sensor 6, including a phase difference detection pixel, detects a phase difference of an object. Using the set of object distance information acquired from the phase difference, a distance map generation unit (not illustrated), which is a part of the image processing unit 7, generates a distance map. The lens system control unit 15 acquires the distance to the main object based on the distance map and, when the distance is shorter than a predetermined distance, uses the output of the shift blur calculation unit described in FIGS. 9A to 9C, or does not use it when the distance is longer than the predetermined distance. This is because the effect of shift blur increases when the object distance is shorter than the predetermined distance, whereas the effect of shift blur decreases when the object distance is longer than the predetermined distance.

According to the aforementioned embodiment, as has been described above, removing the shift blur component unwanted for offset estimation from the amount of blur of the camera system acquired from the motion vector detection unit allows for a more appropriate offset estimation.

Modification Example of Third Embodiment

Figure 9A:
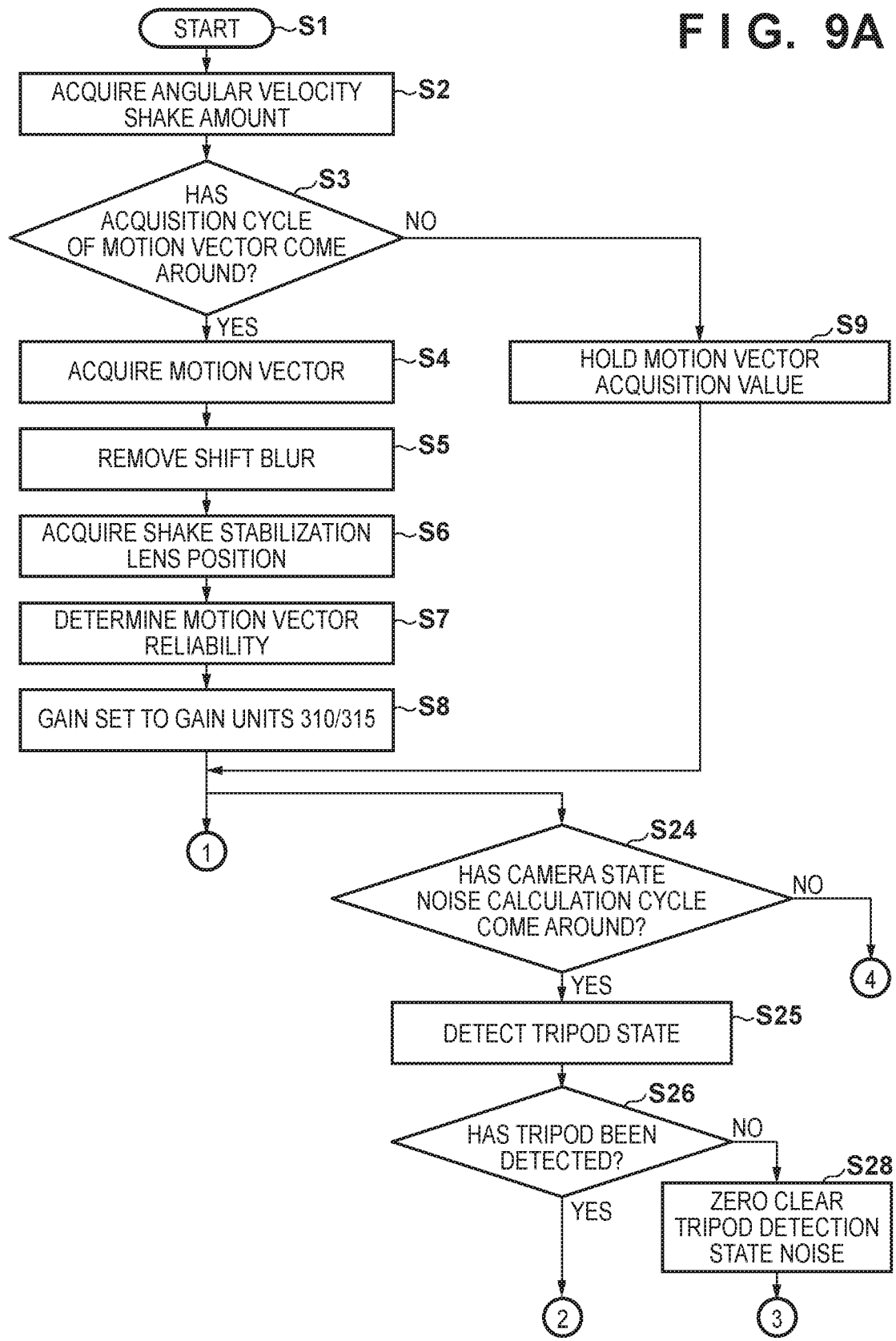
Figure 9B:
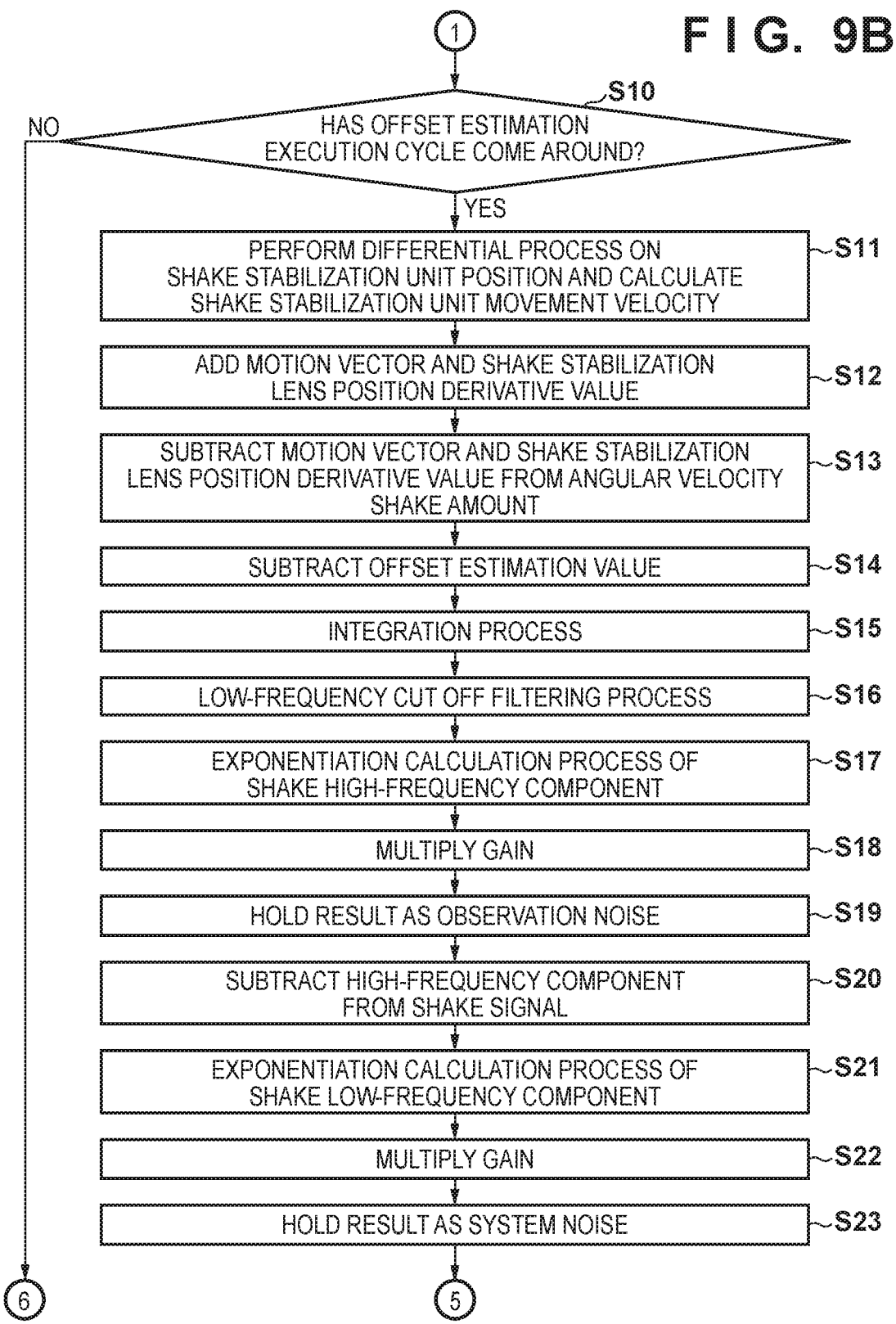

The embodiment described above has prepared therein a block for comparing the angular velocity signal and the acceleration signal, as illustrated in FIGS. 9A to 9C, in order to detect a shift blur. The aforementioned configuration is not essential for achieving the object of the present invention, and, for example, the position signal acquired by double-integrating the acceleration signal may be subtracted from the vector information as the shift blur component.

In addition, detection of the shift blur component need not be performed inside the camera system 100. For example, there may be a configuration in which an external measurement system exists, and the position information in the absolute space of the camera system 100 is acquired via wireless communication.

In addition, the aforementioned embodiment uses the lens side shake detection unit 17 and the acceleration sensor 24 provided on the lens unit 2 to calculate the shift blur amount, and removes the offset error of the gyroscope sensor, which is the lens side shake detection unit 17. However, the present invention is not limited thereto, and the offset error of the lens side shake detection unit 17 may also be removed based on the shift blur amount calculated using a gyroscope sensor or an acceleration sensor built in the camera main body 1.

In addition, although the aforementioned embodiment is different from the second embodiment in that the former includes a unit configured to remove the shift blur component from the motion vector and the noise term calculation unit 410, the aforementioned embodiment may be configured so that only one of the units is added to the second embodiment.

In addition, the first to the third embodiments and modification examples thereof employ a type of image stabilization section that shift-drives a part of the imaging optical system. However, the present invention is not limited thereto, and the image stabilization section may be one that shift-drives the image sensor 6, tilt-drives the lens, or a combination thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-125467, filed on Jul. 4, 2019, and 2019-125466, filed on Jul. 4, 2019 which are hereby incorporated by reference herein in their entirety.

What is claimed is:

1. An image blur information acquisition apparatus comprising
at least one processor or circuit configured to function as:
a first shake acquisition unit configured to acquire a first shake detection result from a first shake detection unit configured to detect a shake amount of an image capturing apparatus based on a motion vector acquired from a plurality of image signals output from an image sensor configured to photoelectrically convert an object image;
a second shake acquisition unit configured to acquire a second shake detection result from a second shake detection unit configured to detect a rotational angular velocity of the image capturing apparatus; and
an estimation unit configured to estimate an amount of offset included in the second shake detection result, based on the first shake detection result and the second shake detection result, wherein
the estimation unit is configured to set degree of change of estimation value by updating the offset amount based on a difference between the second shake detection result and the first shake detection result such that the degree of change of estimation value in a case that a signal corresponding to the difference between the second shake detection result and the first shake detection result is a first value is smaller than the degree of change of estimation value in a case that the signal corresponding to the difference between the second shake detection result and the first shake detection result is a second value that is smaller than the first value.

2. The image blur information acquisition apparatus according to claim 1, wherein the estimation unit is configured to output the offset amount to a stabilization amount acquisition unit configured to acquire, based on an output of the second acquisition unit, an amount of stabilization of image blur used when stabilizing an image blur caused by a shake of the image capturing apparatus, by changing relative positions of the object image and the image sensor.

3. The image blur information acquisition apparatus according to claim 1, wherein
the estimation unit uses a signal having a limited low-frequency component from a signal indicating the difference between the second shake detection result and the first shake detection result as the signal corresponding to the difference between the second shake detection result and the first shake detection result.

4. The image blur information acquisition apparatus according to claim 1, wherein the at least one processor or circuit is configured to further function as a determination unit configured to determine a movement of an object based on a difference between the second shake detection result and the first shake detection result, wherein
the estimation unit is configured to estimate the offset amount based on the first shake detection result, the second shake detection result, and the determination result.

5. The image blur information acquisition apparatus according to claim 4, wherein, when the difference between the second shake detection result and the first shake detection result is equal to or larger than a predetermined value, the estimation unit is configured to temporarily store an estimation value of the offset amount at the time.

6. The image blur information acquisition apparatus according to claim 5, wherein the determination unit is configured to determine that the object is not moving when a value of a difference between the signal indicating the difference between the second shake detection result and the first shake detection result, and the temporarily stored estimation value of the offset amount is equal to or smaller than a second predetermined value.

7. The image blur information acquisition apparatus according to claim 4, wherein the estimation unit is configured not to update the estimation value of the offset amount while the object is moving, based on a determination result from the determination unit.

8. The image blur information acquisition apparatus according to claim 1, wherein the estimation unit is configured to change an update rule of the estimation value of the offset amount, based on the difference between the second shake detection result and the first shake detection result.

9. The image blur information acquisition apparatus according to claim 1, wherein the estimation unit includes a calculation unit and is configured to estimate the offset amount using a Kalman filter and calculate an error variance of the estimation result.

10. The image blur information acquisition apparatus according to claim 1, further comprising a position acquisition sensor configured to acquire a position of an image stabilization member configured to stabilize image blur caused by a shake of the image capturing apparatus by changing relative positions of the object image and the image sensor, wherein
the first shake detection unit is configured to detect a shake amount of the image capturing apparatus based on the motion vector and a position signal acquired by the position acquisition sensor.

11. The image blur information acquisition apparatus according to claim 1, wherein the at least one processor or circuit is configured to further function as a third shake acquisition unit configured to acquire a shift shake detection result from a shift shake detection unit configured to detect a shift shake of the image capturing apparatus, wherein
the first shake detection unit is configured to detect a shake amount of the image capturing apparatus based on the motion vector and the shift shake detection result acquired by the third shake acquisition unit.

12. The image blur information acquisition apparatus according to claim 11, further comprising a position acquisition sensor configured to acquire a position of an image stabilization member configured to stabilize image blur caused by a shake of the image capturing apparatus, by changing relative positions of the object image and the image sensor, wherein
the first shake detection unit is configured to detect a shake amount of the image capturing apparatus based on the motion vector, the position signal acquired by the position acquisition sensor, and the shift shake detection result.

13. The image blur information acquisition apparatus according to claim 11, wherein the first shake detection unit is configured to detect a shake amount of the image capturing apparatus, based on the motion vector and the shift shake detection result, when the shift shake detection result is larger than a predetermined value.

14. The image blur information acquisition apparatus according to claim 11, wherein the at least one processor or circuit is configured to further function as a distance map generation unit configured to generate a distance map that indicates distance information to an object, wherein
the first shake detection unit is configured to detect a shake amount of the image capturing apparatus based on the motion vector and the shift shake detection result acquired by the third shake acquisition unit, when the distance map generated by the distance map generation unit satisfies a predetermined condition.

15. The image blur information acquisition apparatus according to claim 11, wherein the first shake detection unit is configured to detect a shake amount of the image capturing apparatus based on the motion vector and the shift shake detection result acquired by the third shake acquisition unit, when the exposure time set at the time of capturing is set to be equal to or larger than a predetermined time.

16. The image blur information acquisition apparatus according to claim 11, wherein the at least one processor or circuit is configured to further function as a panning detection unit configured to detect a motion of changing an orientation of the image capturing apparatus, wherein
the estimation unit, with the shake amount provided by the panning detection unit being a first amount, is configured to reduce degree of change of estimation value by updating the offset amount to be smaller than a case where the shake amount provided by the panning detection unit is a second amount which is smaller than the first amount.

17. The image blur information acquisition apparatus according to claim 11, wherein the at least one processor or circuit is configured to further function as a tripod detection unit configured to detect a tripod state in which the shake of the image capturing apparatus lies within a predetermined amplitude for a predetermined period, wherein
the estimation unit, with the shake amount in the tripod state being a third amount, is configured to increase degree of change of estimation value by updating the offset amount to be larger than a case where the shake amount in the tripod state is a fourth amount which is larger than the third amount.

18. The image blur information acquisition apparatus according to claim 1, further comprising:
an imaging optical system including a shift lens; and
a drive member configured to change relative positions of the object image and the image sensor by moving the shift lens in a direction different from the optical axis of the imaging optical system.

19. The image blur information acquisition apparatus according to claim 1, further comprising:
the image sensor; and
a drive member configured to change relative positions of the object image and the image sensor by moving the image sensor in a direction different from the optical axis of the imaging optical system.

20. An image blur information acquisition method comprising:
performing a first shake acquisition to acquire a shake amount of an image capturing apparatus based on a motion vector acquired from a plurality of image signals output from an image sensor configured to photoelectrically convert an object image;
performing a second shake acquisition to acquire a detection result of a rotational angular velocity from a shake detection sensor configured to detect a rotational angular velocity of the image capturing apparatus; and
estimating an amount of offset included in the detection result of the second shake acquisition, based on the detection result of the rotational angular velocity acquired in the second shake acquisition and the shake amount acquired in the first shake acquisition, wherein
in estimating the amount of offset, degree of change of estimation value by updating the offset amount is set based on a difference between the detection result of the rotational angular velocity acquired in the second shake acquisition and the shake amount acquired in the first shake acquisition such that the degree of change of estimation value, in a case that a signal corresponding to the difference between the detection result acquired in the second shake acquisition and the shake amount acquired in the first shake acquisition is a first value, is smaller than the degree of change of estimation value in a case that the signal corresponding to the difference between the detection result acquired in the second shake acquisition and the shake amount acquired in the first shake acquisition is a second value that is smaller than the first value.

21. A non-transitory computer-readable storage medium storing programs for causing a computer to execute each process of an image blur information acquisition method, the method comprising:
  performing a first shake acquisition to acquire a shake amount of an image capturing apparatus based on a motion vector acquired from a plurality of image signals output from an image sensor configured to photoelectrically convert an object image;
  performing a second shake acquisition to acquire a detection result of a rotational angular velocity from a shake detection sensor configured to detect a rotational angular velocity of the image capturing apparatus; and
  estimating an amount of offset included in the detection result of the second shake acquisition, based on the detection result of the rotational angular velocity acquired in the second shake acquisition and the shake amount acquired in the first shake acquisition, wherein in estimating the amount of offset, degree of change of estimation value by updating the offset amount is set based on a difference between the detection result of the rotational angular velocity acquired in the second shake acquisition and the shake amount acquired in the first shake acquisition such that the degree of change of estimation value, in a case that a signal corresponding to the difference between the detection result acquired in the second shake acquisition and the shake amount acquired in the first shake acquisition is a first value, is smaller than the degree of change of estimation value in a case that the signal corresponding to the difference between the detection result acquired in the second shake acquisition and the shake amount acquired in the first shake acquisition is a second value that is smaller than the first value.

* * * * *